(12) United States Patent
Karlsson et al.

(10) Patent No.: US 9,265,283 B2
(45) Date of Patent: *Feb. 23, 2016

(54) POLYMERS SELECTIVE FOR TOBACCO SPECIFIC NITROSAMINES AND METHODS OF USING THE SAME

(71) Applicant: British American Tobacco (Investments) Limited, London (GB)

(72) Inventors: Ola John Ivar Karlsson, Lund (SE); Johan Fredrik Billing, Lund (SE); Ecevit Yilmaz, Bjärred (SE); Jan Robert Christian Svensson Stark, Växjö (SE)

(73) Assignee: British American Tobacco (Investments) Limited, London (GB)

( * ) Notice: Subject to any disclaimer, the term of this patent is extended or adjusted under 35 U.S.C. 154(b) by 493 days.

This patent is subject to a terminal disclaimer.

(21) Appl. No.: 13/745,712

(22) Filed: Jan. 18, 2013

(65) Prior Publication Data

US 2013/0139835 A1 Jun. 6, 2013

Related U.S. Application Data

(63) Continuation-in-part of application No. 12/518,051, filed as application No. PCT/EP2007/062781 on Nov. 26, 2007, now Pat. No. 8,733,369.

(30) Foreign Application Priority Data

Dec. 7, 2006 (SE) .................................... 0602625-6
Jan. 19, 2012 (GB) .................................... 1200878.5

(51) Int. Cl.
*C08F 220/00* (2006.01)
*A24B 15/24* (2006.01)
*A24B 15/28* (2006.01)

(52) U.S. Cl.
CPC .................................... *A24B 15/245* (2013.01)

(58) Field of Classification Search
USPC .......... 131/297, 331, 332, 290, 298, 347, 360
See application file for complete search history.

(56) References Cited

U.S. PATENT DOCUMENTS 5,587,273 A 12/1996 Yan et al.
5,601,097 A 2/1997 De Grandpré et al.
(Continued)

FOREIGN PATENT DOCUMENTS

CA 2565129 A1 12/2005
EP 1756023 B1 4/2012
(Continued)

OTHER PUBLICATIONS

Masque, N. et al. "Molecularly imprinted polymers: new tailor-made materials for selective solid-phase extraction," Trends in Analytical Chemistry, vol. 20, No. 9, 2001, pp. 477-486.
(Continued)

*Primary Examiner* — Dennis Cordray
(74) *Attorney, Agent, or Firm* — N W Poulsen; L A Pinol

(57) ABSTRACT

A class of molecularly imprinted polymers that specifically recognizes and binds to TSNAs are useful, for example, in analysis and separation of TSNAs from biological fluids. Such polymers are also useful in methods of treating and manufacturing tobacco products and materials. Also disclosed are selectively adsorbent non-molecularly imprinted polymer of a non-acidic monomer and a cross-linker having polar functionality, one of which is hydrophilic, the other of which is hydrophobic, and the use of such polymers in the treatment of materials containing nicotine and nitrosamine.

16 Claims, 11 Drawing Sheets

(56) References Cited

U.S. PATENT DOCUMENTS

| | | | |
|---|---|---|---|
| 5,810,020 | A | 9/1998 | Northway et al. |
| 8,252,876 | B2 | 8/2012 | Yilmaz et al. |
| 8,733,369 | B2 | 5/2014 | Rees et al. |
| 8,807,142 | B2 | 8/2014 | Bhattacharyya et al. |
| 8,889,795 | B2 | 11/2014 | Rees et al. |
| 2002/0134394 | A1 | 9/2002 | Baskevitch et al. |
| 2003/0003587 | A1 | 1/2003 | Murray |
| 2006/0037620 | A1 | 2/2006 | Thompson |
| 2007/0186940 | A1 | 8/2007 | Bhattacharyya et al. |
| 2008/0154007 | A1 | 6/2008 | Mori et al. |
| 2011/0054132 | A1 | 3/2011 | Yiannikouris et al. |
| 2013/0139834 | A1 | 6/2013 | Karlsson et al. |
| 2015/0038648 | A1 | 2/2015 | Rees et al. |

FOREIGN PATENT DOCUMENTS

| | | | |
|---|---|---|---|
| GB | 1441543 | | 7/1976 |
| WO | 9411403 | | 5/1994 |
| WO | 9933768 | | 7/1999 |
| WO | 0032648 | | 6/2000 |
| WO | WO 01/65954 | A1 | 3/2001 |
| WO | WO 2005/112670 | A1 | 12/2005 |
| WO | 2006067431 | A1 | 6/2006 |
| WO | 2007067140 | A1 | 6/2007 |
| WO | 2008068153 | A2 | 6/2008 |
| WO | 2010085851 | A1 | 8/2010 |
| WO | 2012158915 | A2 | 11/2012 |

OTHER PUBLICATIONS

"SupelMIP Highly Selective SPE for Trace Analysis in Complex Matrixes," Sigma-Aldrich, 2006.
Simelis, O.; Whilborg, A.; Aurand C.; Trinh, A. Trace Level Analysis of NNAL in Urine Using SupelMIP SPE-NNAL. No Date.
International Search Report for PCT/GB2012/053247 dated Apr. 30, 2013.
International Preliminary Report on Patentability for PCT/GB2012/053247 dated Jul. 22, 2014.
Notice of Acceptance from Australian Patent Office, dated May 9, 2011, for Australian Patent Application 2007329060, filed Nov. 26, 2007. [Previously submitted to USPTO in U.S. Appl. No. 12/518,051, filed Nov. 5, 2010].
Australian Office Action, dated Aug. 19, 2010, for Australian Patent Application 2007329060, filed Nov. 26, 2007. [Previously submitted to USPTO in U.S. Appl. No. 12/518,051, filed Nov. 5, 2010].
Vianna-Soares, Cristina D., et al., "HPMA and HEMA Copolymer Bead Interactions with Eukaryotic Cells," Materials Research, vol. 7, No. 3, 473-477, 2004.
Dirion et al., "Selective Solid Phase Extraction . . . ," Chromatographia 2002, 56 Aug. (No. 3-4).
Sellergren "Highly Enantioselective and Substrate-Selective Polymers . . . ", J. Am. Chem. Soc. 1988, 110:5853-5860.
Liu et al., "Molecularly Imprinted Solid-Phase Extraction Sorbent . . . ," Analytical Letters, 2003, 36(8):1631-1645.
Zander et al., "Analysis of Nicotine and Its Oxidation Products . . . ," Anal. Chem. 1998, 70:3304-3314.
ISR mailed Aug. 29, 2005 for PCT/SE2005/000773, filed May 24, 2005.
Sellergren, B., et al., "The Use of Molecularly Imprinted Polymers . . . ," Chapter 23, Handbook of Sample Preparation (2011), pp. 443-471.
Cook, A., et al., "Bascicity of Some Mono- and Bicyclic Enamines . . . ," J. Org. Chem., 1995, 60, 3169-3171.
IPRP dated Sep. 4, 2006 for PCT/SE2005/000773, filed May 24, 2005.
Liqing Wu, et al., "Study on the recognition of templates and their analogues . . . ," J. Mol. Recognit., Nov.-Dec. 2004; 17 (6):567-574.
Jun Matsui, et al., "A Molecularly Imprinted Nicotine-Selective Polymer," Analytical Letters, 1996, pp. 2071-2078.
Naghash, Hamid J. et al., "Size Distribution of Polymers During . . . ," Polymer Bulletin 37, pp. 207-213 (1996).
Brannock et al., "Enamine Chemistry IV. Cycloaddition Reaction of Enamines . . . ," Apr. 1964.
Byrd et al., "Liquid chromatographic/tandem mass spectrometric method . . . ," 2003.
Kempe et al., "Review of Molecular Imprinting Used for Chrial Separations," 1995.
Mayes et al., "Molecularly imprinted polymers: useful materials for analytical chemistry?" 1997.
Sellergren, "Noncovalent molecular imprinting: antibody-like molecular recognition . . . ," 1997.
Wu et al., "Simultaneous Determination of Five Tobacco-Specific Nitorsamines . . . ," 2003.
Wulff, "Molecular Imprinting in Cross-Linked Materials," 1995.
Communication from the EPO Examining Division (with Annex), dated Sep. 21, 2009, for EP05744145.3, filed May 24, 2005.
Decision to Grant a European Patent, dated Mar. 15, 2012, for EP05744145.3, filed May 24, 2005.
WO mailed Jun. 19, 2006, for PCT/SE2005/000773, filed May 24, 2005.
Okay, Oguz et al., "Synthesis and Formation Mechanism of Porous 2-Hydroxyethyl Methacrylate-Ethylene . . . ," Journal of Applied Polymer Science, vol. 46, 401-410 (1992).
Okay, O., "Macroporous Copolymer Networks," Prog. Polym. Sci. 25 (2000) pp. 711-779.
Xia, Yang et al. "Analysis of the Tobacco-Specific Nitrosamine . . . "Analytical Chem., Amer. Chem. Soc., Columbus, US, vol. 77, No. 23, Dec. 1, 2005, pp. 7639-7645.
Liu, Y., et al., Molecularly Imprinted Solid-Phase Extraction Sorbent for Removal of Nicotine from Tobacco Smoke, Analytical Letters, vol. 36, No. 8, Jan 1, 2003, pp. 1631-1645.
International Search Report and Written Opinion, mailed Jul. 25, 2008, for PCT International Application No. PCT/EP2007/062781, filed Nov. 26, 2007.
International Preliminary Report on Patentability, issued Jun. 10, 2009, for PCT International Application No. PCT/EP2007/062781, filed Nov. 26, 2007.

Target     Amide     Enamine

Sulfonamide     Formamide

FIGURE 4
Figure 4A
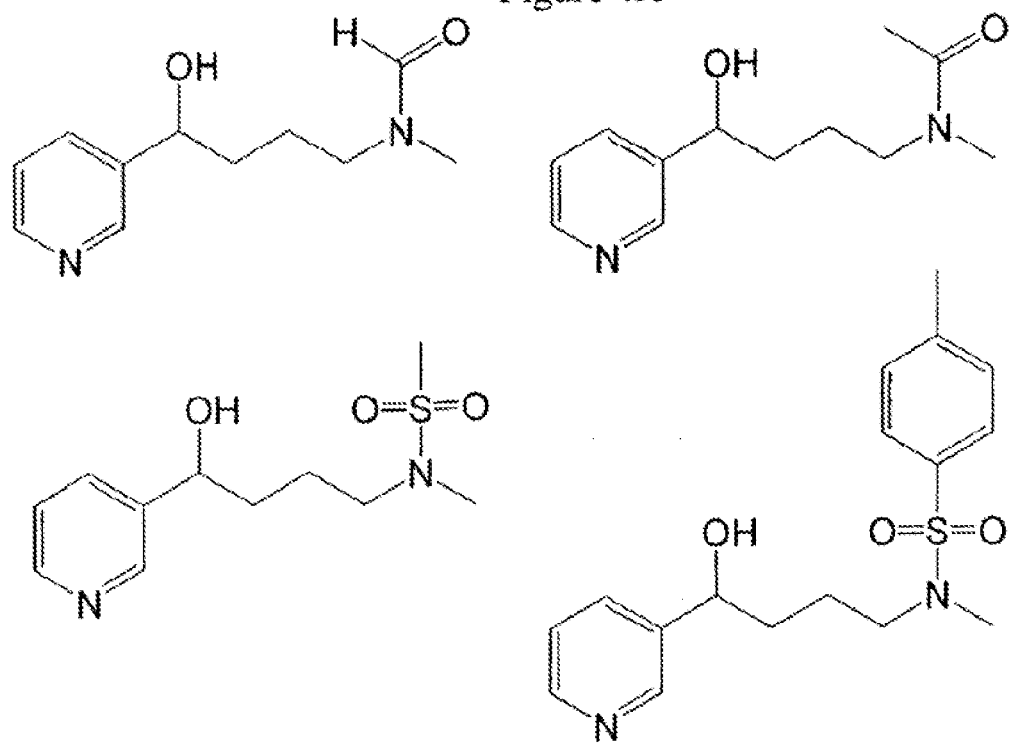
Figure 4B
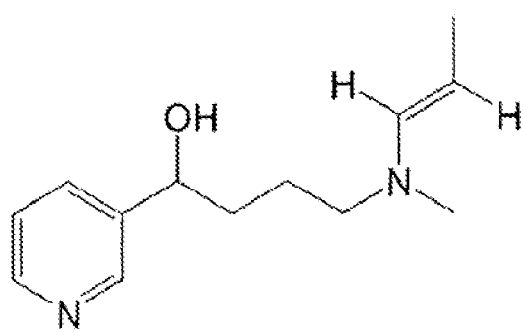

2-Hydroxy methacrylate (HEMA)

Ethylene glycol dimethacrylate (EDMA)

FIGURE 7
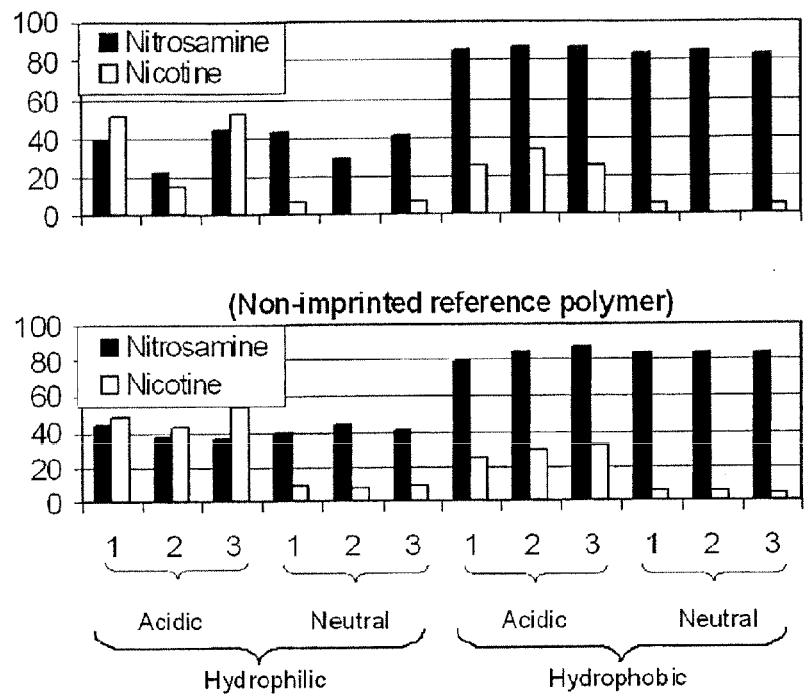
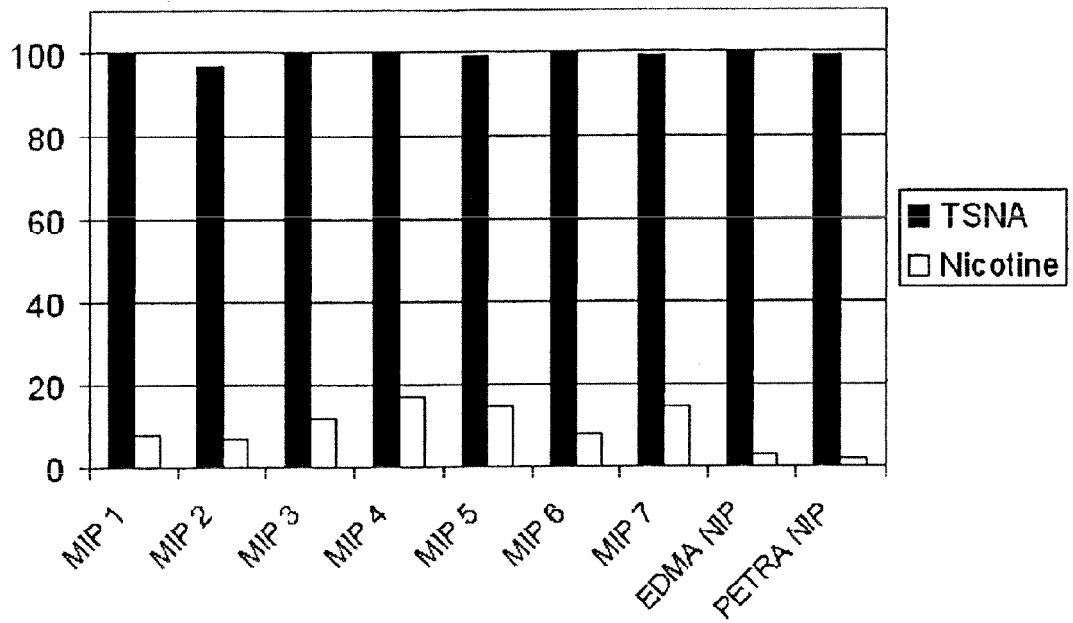
FIGURE 8

POLYMERS SELECTIVE FOR TOBACCO SPECIFIC NITROSAMINES AND METHODS OF USING THE SAME

CROSS-REFERENCE TO RELATED APPLICATIONS

This application is a continuation in part of U.S. application Ser. No. 12/518,051 (Publication No. US 2011/0041859) having a §371 (c)(1), (2) and (4) date of 5 Nov. 2010, which was a National Stage Entry of International Application No. PCT/EP2007/062781 filed 26 Nov. 2007, and which claims priority under 35 U.S.C. §119 to Swedish Patent Application No. SE0602625-6 filed 7 Dec. 2006. It also claims priority under 35 U.S.C. §119 to Great Britain Patent Application No. GB1200878.5 filed 19 Jan. 2012. The entire disclosures of these earlier related applications are incorporated herein by reference.

FIELD OF THE INVENTION

This invention relates to a method for selectively removing nitrosamine from material containing nitrosamine. In some embodiments the invention relates to molecularly imprinted polymers and use of the polymers in bioanalysis and separation of nicotine metabolites. More specifically, the invention relates to molecularly imprinted polymers and non-molecularly imprinted counterparts thereof having specificity for tobacco specific nitrosamines and includes methods of using the polymers to treat tobacco, tobacco substitutes, and their derivatives to reduce the level of targeted compounds therein.

BACKGROUND TO THE INVENTION

In the fields of medical, dietary, environmental and chemical sciences there is an increasing need for the selective separation of specific substances from complex mixtures of related substances. The aim can be the quantitative extraction of a certain compound or compounds, the measurement of their concentration or the selective removal of a target compound from a multi-component mixture.

Stricter health controls have increased the demand for methods allowing sensitive and selective quantification of hazardous products and metabolites from certain everyday substances in widespread use. Of particular concern are chemical compounds related to use of tobacco-based products, which compounds are either originally present in the raw tobacco leaf itself or generated during the smoking process. Nitroso-containing compounds, such as nitrosamines, are regarded as being of special significance in this regard.

With the aim of reducing the occurrence of hazards related to smoking, certain pharmaceutical products have been produced containing only the neuroactive substance, nicotine, the chemical claimed to be responsible for the dependence aspects of smokable material.

Among the nicotine formulations for smoking cessation therapy, nicotine chewing gum has found the most widespread use. The quality control required during production includes monitoring of nicotine levels as well as monitoring of the primary nicotine oxidation products cotinine, myosmine, nicotine-cis-N-oxide, nicotine-trans-N-oxide and beta-nicotyrine. Quantitation of nornicotine, anatabine and anabasine is also desirable, if not required. Improved methods and materials for such monitoring and quantitation are needed in the art. Use of such cigarette substitutes can cause nitrosamine nicotine metabolites to be produced in vivo by natural metabolic processes during the residence of the nicotine within body tissues. The levels of these metabolites remain below the concentrations at which most analytical procedures can perform quantitatively. So in addition to methods and materials for use during product manufacture, there remains a need for improved ways to monitor the low levels of nicotine metabolites in vivo.

Along with the needs felt in relation to newer products, traditional tobacco products also require methods and materials for quantifying, reducing or removing components from tobacco or tobacco smoke. Such components include tobacco specific nitrosamines (TSNAs) and their alkaloid precursors:

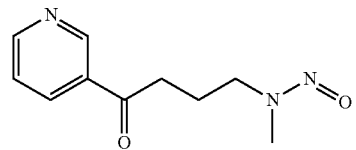

4-(methylnitrosamino)-1-(3-pyridyl)-1-butanone ("NNK"),

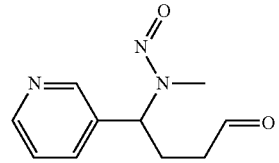

4-(methylnitrosamino)-4-(3-pyridyl)butanal ("NNA"),

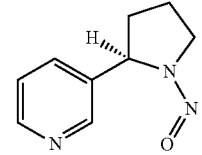

N-nitrosonornicotine ("NNN"),

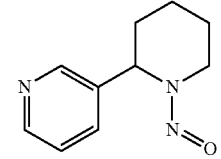

N-nitrosoanabasine ("NAB"),

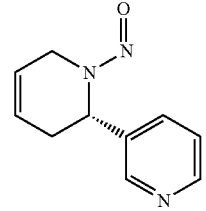

N-nitrosoanatabine ("NAT"),

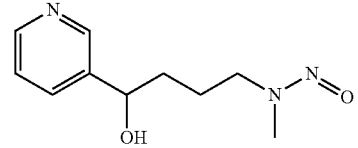

4-(methylnitrosamino)-1-(3-pyridyl)-1-butanol ("NNAL"),

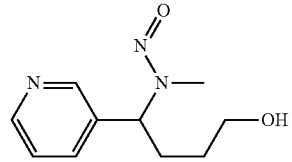

4-(methylnitrosamino)-4-(3-pyridyl)-1-butanol ("isol NNA") and

-continued

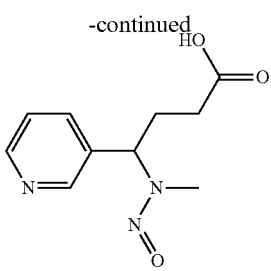

4-(methylnitrosamino)-4-(3-pyridyl)butanoic acid ("iso-NNAC").

To properly quantify the amount of such compounds present in human biological fluids, methods are being developed to analyse the alkaloids, especially the nitrosylated decomposition products and metabolites in tobacco. Existing chromatographic separation or extraction methods used for this analysis lack the robustness, sensitivity and speed required in order to handle the large number of samples generated when screening the general population. With existing methods, the low concentration of nitrosamines, typically present in picograms per milliliter, demands extensive sample preparation with multi-step extractions and often chemical derivatization (for example deuteration prior to mass spectrometry) of the analyte prior to analysis. One reason for this complexity is that existing separation materials are not selective as, for example, an antibody or biological receptor might be for the metabolites in question but rather rely on physicochemical properties like charge or hydrophobicity of the metabolites for the separation behaviour. These physicochemical properties may be shared by many other irrelevant molecules in the sample. A quick and simple method for the analysis of TSNAs is therefore a significant unmet medical analytical need.

During recent years numerous reports of selective recognition of small molecules with materials prepared by molecular imprinting (molecularly imprinted polymers or MIPs) have appeared. MIPs are polymers having reactive sites adapted to bind selectively with targeted compounds. Non-covalently prepared molecularly imprinted materials have been used for chiral recognition of a variety of small molecules including therapeutic drugs, sugars, nucleotide bases, and pesticides as well as steroid and peptide hormones. The high affinity and selectivity for the target analyte exhibited by some of the imprinted materials have justified a comparison with the corresponding immuno-affinity (IA) phases. In contrast to the latter phases however, the MIP materials are straightforward to prepare, stable in most media and reusable over long periods of time. Applications of the MIP materials in chromatography, separation (continuous or batch), chemical sensing or in specific assays are therefore under investigation.

Another application is solid-phase extraction (SPE) of analytes present in low concentrations in biological samples, or in complex matrices. SPE may lead to selective enrichment and clean-up of an analyte to levels not achievable with existing methods. Molecularly imprinted solid phase extractions (MISPE) have been used in bioanalysis, food analysis and environmental analysis. In these examples selective enrichment and clean-up of the analyte is obtained resulting in higher accuracy and a lowering of the detection limit (LOD) in the subsequent chromatographic (eg HPLC) or mass spectrometric quantification.

In view of their high selectivity combined with good affinity for the target molecule or a group of target molecules, MIPs have attracted considerable interest from the food industry as a tool to improve food quality. This requires the use of a MIP for selective removal of undesirable components from the food matrix. Since these components are often present in low concentrations, the saturation capacity of the MIP is typically not a limiting factor.

According to WO 05/112670, which is specifically incorporated by reference herein, it can be preferred to have MIP material capable of selectively absorbing the most common nitrosylated nicotine derivatives from complex matrices such as urine, giving quantitative recovery and thereby leading to low errors in the estimation of chemical concentrations. The examples of WO 05/112670 are limited to MIPs prepared using acidic or highly acidic template monomers such as methacrylic acid (MAA), trifluoromethacrylic acid (TF-MAA), 4-vinylbenzoic acid, and 4-vinyl benzene sulphonic acid.

In addition to quantification it is also well known to attempt to reduce the harmful effects of consuming material containing tobacco, tobacco substitutes or mixtures thereof by reducing the levels of targeted compounds. Such reductions can be made in the material itself or in a derivative thereof such as an extract of the material. Reduction can also be effected in the thermal decomposition products of the material, i.e. mainstream and sidestream smoke obtained by combustion, or the aerosols produced by heating the material to a temperature below its combustion temperature. One well known method for this sort of reduction is to contact the thermal decomposition products of the material with a filter that adsorbs undesired components therefrom. An alternative method involves solvent extraction of the material, for example as disclosed in the U.S. Pat. No. 5,601,097. According to that specification, the protein content of tobacco material is reduced by treating the tobacco with a solution containing a surfactant to extract polypeptides, separating the solution, removing the surfactant and the polypeptides from the solution, and recombining the solution with the tobacco material. International patent specification WO 01/65954 discloses a process in which tobacco is contacted with a supercritical extraction fluid such as supercritical carbon dioxide to selectively reduce or eliminate nitrosamines.

These processes are equally applicable to both tobacco itself and to tobacco substitutes, i.e., natural or synthetic materials having similar characteristics to natural tobacco that enable them to be consumed in a similar way to tobacco, whether by smoking, chewing, inhaling or otherwise. There has been an attempt to remove nicotine from tobacco smoke using MIPS, as reported in Liu, Y., et al., Molecularly imprinted Solid-Phase Extraction Sorbent for Removal of Nicotine from Tobacco Smoke, *Analytical Letters*, Vol. 36, No. 8, pp 1631-1645 (2003). The MIP described in the article was designed to bind nicotine and not the more toxic nicotine metabolites such as nitrosamines. It is unclear if the MIP was in fact selective for nicotine as the scientific method producing the data was lacking in key control-checking elements. As described in WO 05/112670, MIPs selective for TSNAs can be used to treat tobacco products and thereby reduce the levels of one or more nitroso-containing compounds from the tobacco product. Such MIPs further find use in the analysis and quantification of TSNAs in vivo, commonly in relation to consumption of tobacco products, and in the preparation and evaluation of non-tobacco products. So despite advances there remains a need in the art for novel MIPs and methods of employing the same in the field of nicotine and nicotine metabolites.

SUMMARY OF THE INVENTION

The present invention meets the needs in the art by providing unique MIPs which are particularly selective for nitroso-containing compounds.

MIPs of the invention can be obtained by co-polymerising a neutral functional monomer or monomers and a hydrophobic cross-linker in the presence of a structural analogue of a nitrosamine, in a polymerization medium containing a free radical initiator, after which the template is removed from the MIP.

The invention includes the use of the MIPs for analytical and preparative extractions, in chromatography, for analytical sample pre-treatment, in chemical sensors or as a solid phase filter for extraction of TSNAs from nicotine-containing substances or devices.

According to one embodiment, a molecularly imprinted polymer selective for at least one tobacco specific nitrosamine (TSNA) is provided, the polymer having been prepared using materials comprising a TSNA or a structural analogue thereof, a neutral functional monomer, and a hydrophobic cross-linker. The structural analogue of a TSNA could be an enamine analogue of a TSNA or a sulfonamide analogue of a TSNA or an amide analogue of a TSNA, e.g. a formamide analogue of a TSNA. The neutral functional monomer could be selected from the group consisting of 2-hydroxyethylmethacrylate (HEMA), acrylamide, methacrylamide, glycerol monoacrylate, and glycerol monomethacrylate. The hydrophobic cross-linker could be selected from the group consisting of ethylene glycol dimethacrylate (EDMA), trimethylolpropane trimethacrylate (TRIM), and divinylbenzene (DVB). In the embodiment of the invention, the polymer could be selective for NNK, NNA, NNN, NAB, NAT, NNAL, iso-NNAL, or iso-NNAC.

We have now identified certain non-molecularly imprinted polymers ("NIPs") that broadly comprise non-molecularly imprinted polymers of a non-acidic monomer (e.g. a monoalkenyl monomer) and a cross-linker (e.g. a di-, tri- or polyalkenyl monomer) having polar functionality, one of the monomer and crosslinker being hydrophilic, the other being hydrophobic.

In one aspect the invention provides a method for selectively removing nitroso-containing compound from material containing the compound, said method comprising contacting the material with a non-molecularly imprinted polymer of a non-acidic monomer and a cross-linker having polar functionality, one of which is hydrophilic, the other of which is hydrophobic.

The NIPs may also be useful in the selective removal of nitoros-containing compounds from mixtures thereof with nicotine. In another aspect, the invention provides a method for selectively removing nitroso-containing compound from material containing the compound and nicotine, said method comprising contacting the material with a selectively adsorbent non-molecularly imprinted polymer of a non-acidic monomer and a cross-linker having polar functionality, one of which is hydrophilic, the other of which is hydrophobic.

Nicotine of Formula

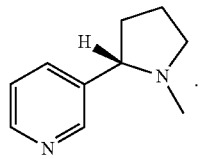

as can be seen, has heteroaromatic and heterocycloaliphatic nitrogen but does not have nitroso, carbonyl, hydroxyl or carboxylate groups in its molecule. It is believed, although the invention does not depend on this theory, that the use of a copolymer derived from monomers in which there is a difference in hydrophobicity gives a pattern of regions or domains that preferentially bind non-polar portions of the relevant small molecules and regions or domains where polar regions of the relevant small molecules can more readily bind and possibly form hydrogen bonds, these regions or domains giving rise to the observed difference in adsorption without the need for molecular imprinting.

According to a further embodiment of the invention, a smoking article is provided, comprising a smoking material and a molecularly imprinted polymer or a non-molecularly imprinted polymer according to the embodiments described above.

According to a further embodiment of the invention, a smoke filter can comprise a molecularly imprinted polymer or a non-molecularly imprinted polymer as described above.

According to a further embodiment of the invention, a kit can comprise a molecularly imprinted polymer or non-molecularly imprinted polymer according to the above and instructions for using the molecularly imprinted polymer to perform at least one of detecting, quantifying, and separating nitrosamines in a sample.

According to a further embodiment of the invention, a method of preparing a molecularly imprinted polymer selective for TSNAs is provided, comprising copolymerizing at least one neutral functional monomer and at least one hydrophobic cross-linker in the presence of at least one TSNA structural analogue in a polymerization medium containing at least one free radical initiator to produce a molecularly imprinted polymer bound to a TSNA structural analogue and removing the TSNA structural analogue from the molecularly imprinted polymer.

According to a further embodiment of the invention, a method of reducing the level of at least one TSNA in a tobacco product is provided, comprising treating the tobacco product with a molecularly imprinted polymer or non-molecularly imprinted polymer according to the invention. The tobacco product could be produced by the thermal decomposition of a material containing tobacco, a tobacco substitute or a mixture thereof, for example, by heating the material to a temperature below its combustion temperature, by combustion of the material, or by contacting a material containing tobacco, a tobacco substitute or a mixture thereof with a solvent.

According to a further embodiment of the invention a method of manufacturing a tobacco material is provided, comprising the steps of treating a material containing tobacco, tobacco substitute or a mixture thereof with a solvent to produce an extract, contacting the extract with a molecularly imprinted polymer or non-molecularly imprinted polymer according to the invention so as to reduce the level thereof in the extract, and combining the treated extract with the extracted tobacco material.

In this specification, "tobacco product" means a material containing tobacco (including tobacco leaf or tobacco stem), or a tobacco substitute, or a blend of tobacco and tobacco substitutes, and derivatives of such material, including extracts of the material, smoke produced by thermal decomposition of the material and aerosols produced by heating the material to below its combustion temperature.

Where the tobacco product is a derivative produced by the thermal decomposition of material containing tobacco or a tobacco substitute, the decomposition may be effected by combustion of the material, as in a conventional cigarette, or by heating the material to a temperature below its combustion temperature, in accordance with a process used in some known alternative tobacco products in order to produce an aerosol that is inhaled by the consumer.

Alternatively, the tobacco product may be a derivative produced by contacting material containing tobacco or a tobacco substitute with a solvent. In particular, the invention provides a method of manufacturing a material for smoking comprising the steps of extracting smokable material with a solvent, treating the extract with a MIP or NIP selective for at least one nitroso-compound to reduce the level thereof in the extract and combining the treated extract with the smokable material.

In this process, the smokable material may be in any convenient form, for example fines, stems, scraps, cut lamina, shredded stems, or any combination thereof. The solvent may be aqueous or non-aqueous, such as methanol, ethanol or a super-critical fluid extraction medium, such as super-critical carbon dioxide liquid. The extraction may be carried out under any conditions favoring the extraction of nitrogen-containing compounds from tobacco.

The invention further provides a cigarette or other smoking article containing tobacco material reduced in nitrosmaines relative to nicotine, the reduction being effected by treating the tobacco material with water or other extraction fluid to form an extract; treating the extract with a selectively adsorbent non-molecularly imprinted polymer of a non-acidic monomer and a cross-linker having polar functionality, one of which is hydrophilic, the other of which is hydrophobic; and recombining material remaining in the extract with the tobacco material.

The invention also includes a smoking article comprising tobacco or tobacco substitute and a MIP or NIP selective for the removal of at least one nitroso-containing compound from the thermal decomposition product thereof.

The smoking article of the invention may take any conventional form, for example a cigarette, cigar or cigarillo. In particular the smoking article may comprise a rod of smoking material optionally in a wrapper, with or without a filter. The wrapper may be of paper, tobacco leaf, reconstituted tobacco or a tobacco substitute. Alternatively, where, for example, the smoking article is intended to produce low emissions of sidestream smoke, or lower levels of pyrolysis products in the mainstream smoke, the wrapper may be composed of non-combustible inorganic material such as a ceramic material. The filter may be of any suitable material, for example fibrous cellulose acetate, polypropylene or polyethylene, or paper.

The smoking material is preferably tobacco but may be a tobacco substitute such as non-tobacco smoking material. Examples of non-tobacco smoking materials are dried and cured vegetable material, including fruit materials, and a synthetic smoking material such as may be produced from alginates and an aerosol-generating substance such as glycerol. The smoking material may also comprise a blend of tobacco and non-tobacco smoking materials. Where the smoking material comprises tobacco, the tobacco may be of any suitable type, or a blend thereof, including air-cured, fire-cured, flue-cured, or sun-cured lamina or stem, and may have been processed using any appropriate process. For example, the tobacco may be cut, shredded, expanded or reconstituted. The smoking material may also include conventional additives, such as ameliorants, colorants, humectants (such as glycerol and propylene glycol), inert fillers (such as chalk), and flavourings (such as sugar, liquorice and cocoa).

The invention may also be applied to tobacco that is intended for oral or nasal consumption by sucking, chewing, or nasal ingestion, rather than smoking. Such products include snuff, snus, and chewing tobacco.

The MIP or NIP may be incorporated in the smokable material. Accordingly, the invention includes smoking material containing a MIP selective for the removal of at least one tobacco specific nitrosamine from the thermal decomposition products of the smokable material. Alternatively, where the smoking article comprises a rod of smokable material in a wrapper, the MIP or NIP may be incorporated in the wrapper. The invention therefore includes wrapper material for smoking articles comprising a molecularly-imprinted polymer selective for the removal of a targeted component from the thermal decomposition products of a smoking material. The wrapper may be a cellulose-based material such as a paper or a tobacco based material such as reconstituted tobacco.

The preferred smoking articles of the invention are cigarettes, comprising a rod of tobacco, wrapper, and a filter including a MIP or NIP selective for the removal of at least one tobacco specific nitrosamine from the thermal decomposition products of a smokable material. The invention also includes a smoke filter comprising a MIP selective for the removal of at least one tobacco specific nitrosamine from the thermal decomposition products of a smoking material. The smoke filter may be produced separately from the smoking article, for example in the form of a cigarette or cigar holder, or it may be integrated into the smoking article, for example in the form of a cigarette with a filter tip.

Smoke filters in the form of filter tips may be of any conventional construction. For example a "dalmatian" type filter comprising a section of fibrous filter material, such as cellulose acetate, the MIP being in particulate form and distributed throughout the section. Alternatively the filter may be in the form of a "cavity" type filter, comprising multiple sections wherein the MIP or NIP may lie between two adjacent sections of fibrous filter material. The smoke filter may also comprise other adsorbent materials such as an ion-exchange resin, a zeolite, silica, alumina or amberlite.

In use, the smoke passes through the filter, the MIP or NIP selectively adsorbs and retains the targeted compounds from the smoke and the filtered smoke is delivered to the smoker.

The smoke filters and smoking articles according to the invention may include means for protecting the MIP or NIP from, or reducing its exposure to, smoke when in use. This may be achieved in a number of different ways. For example the smoke filter may comprise a filter element for adsorbing materials from the vapour or particulate phase of smoke. Such filter elements may comprise a general adsorbent such as activated carbon, which may be in any convenient form, such as threads, particles, granules, cloth, or paper. The filter element may also be a selective adsorbant such as an ion-exchange resin, a zeolite, silica, alumina or amberlite. The means for protecting the MIP may include two or more such filter elements of different compositions, for example a first filter element of cellulose acetate, and a second filter element of activated carbon. The provision of multiple filter elements in smoke filters and smoking articles is well known, and any conventional configuration of filter, and associated methods of construction, may be used.

BRIEF DESCRIPTION OF THE DRAWINGS

FIG. 4A shows examples of amide and sulfonamide based target analogs;

FIG. 4B shows an enamine target analogue (MPAPB) used as a template to prepare a MIP for extraction of NNAL;

FIG. 7 shows results from extraction of N-nitrosopiperidine and nicotine where template 1 is formamide, template 2 is enamine and template 3 is sulfonamide;

FIG. 8 shows percentage of TSNAs and nicotine extracted from aqueous solution;

In the drawings, similar features are given like reference numerals.

DETAILED DESCRIPTION OF PREFERRED EMBODIMENTS

Molecularly Imprinted Polymers

Molecular imprinting typically consists of the following steps: (1) a template compound, which may be the targeted molecule or a structural analogue thereof, is allowed to interact with a selected functional monomer, or monomers, in solution to form a templatemonomer complex; (2) the template-monomer complex is copolymerized with a cross-linking monomer resulting in a polymeric matrix incorporating the template compound; (3) the template compound is extracted from the polymer matrix to form a MIP that can be used for selective binding of the targeted molecule.

Prior to step (3), where the MIP is prepared as a solid polymer (or monolith) it is typically crushed and sieved to obtain a desired size fraction of particulate material. When prepared by either suspension or emulsion polymerization methods, such crushing and sieving is unnecessary since the particle size can be controlled within the desired limits during the polymerization process. Particulate material prepared by any of the aforementioned methods can be packed into a chromatographic or solid phase extraction column and used for chromatographic separation of the template from other components of a mixture, including molecules with similar structures or functionalities.

The reactive sites on the molecularly imprinted polymer exposed by removal of the template compound will be in a stereo-chemical configuration appropriate for reaction with fresh molecules of the targeted molecule. As a result, the molecularly imprinted polymer can be used for selective binding of the targeted molecule.

The 'non-covalent' route has been widely used to generate molecularly imprinted binding sites. This makes use of non-covalent self-assembly of the template compound and functional monomers to form the template-monomer complex, followed by free radical polymerization in the presence of a cross-linking monomer and finally template compound extraction. Covalent imprinting, in which the template molecule and a suitable monomer or monomers are covalently bound together prior to polymerization, can also be carried out according to known methods. The binding properties of the MIPS formed by either of the above methods can be examined by re-binding of the template molecule.

Figure 1:
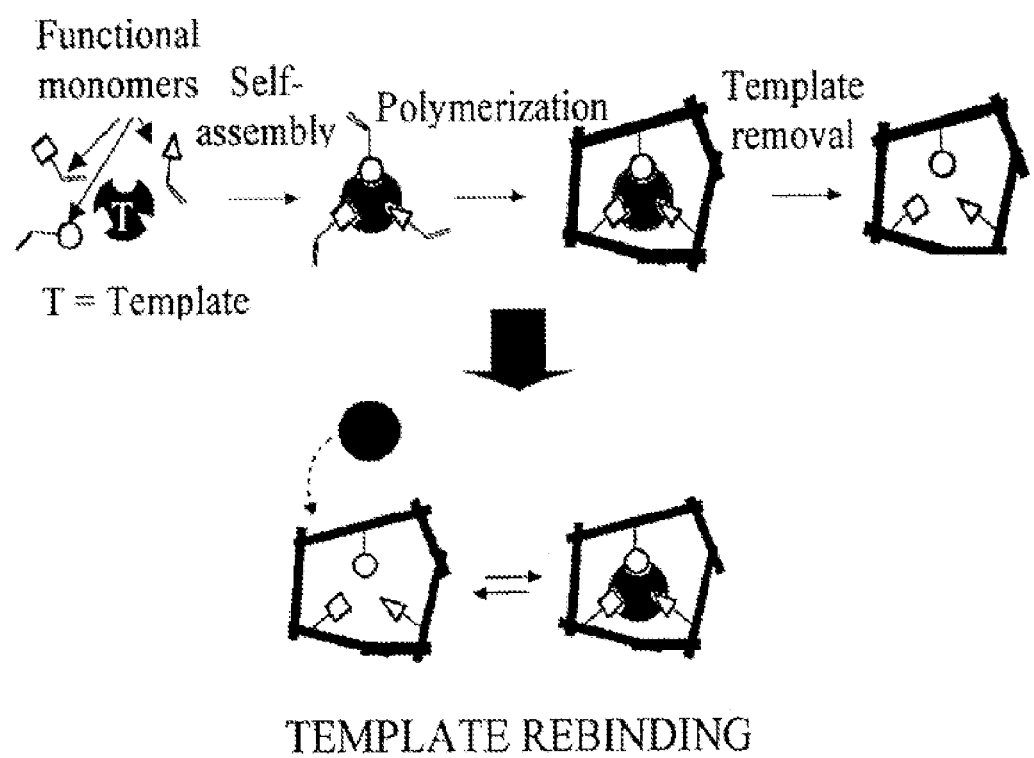
FIG. 1 shows an outline of the procedure for synthesis of an imprinted polymer.
Figure 2:
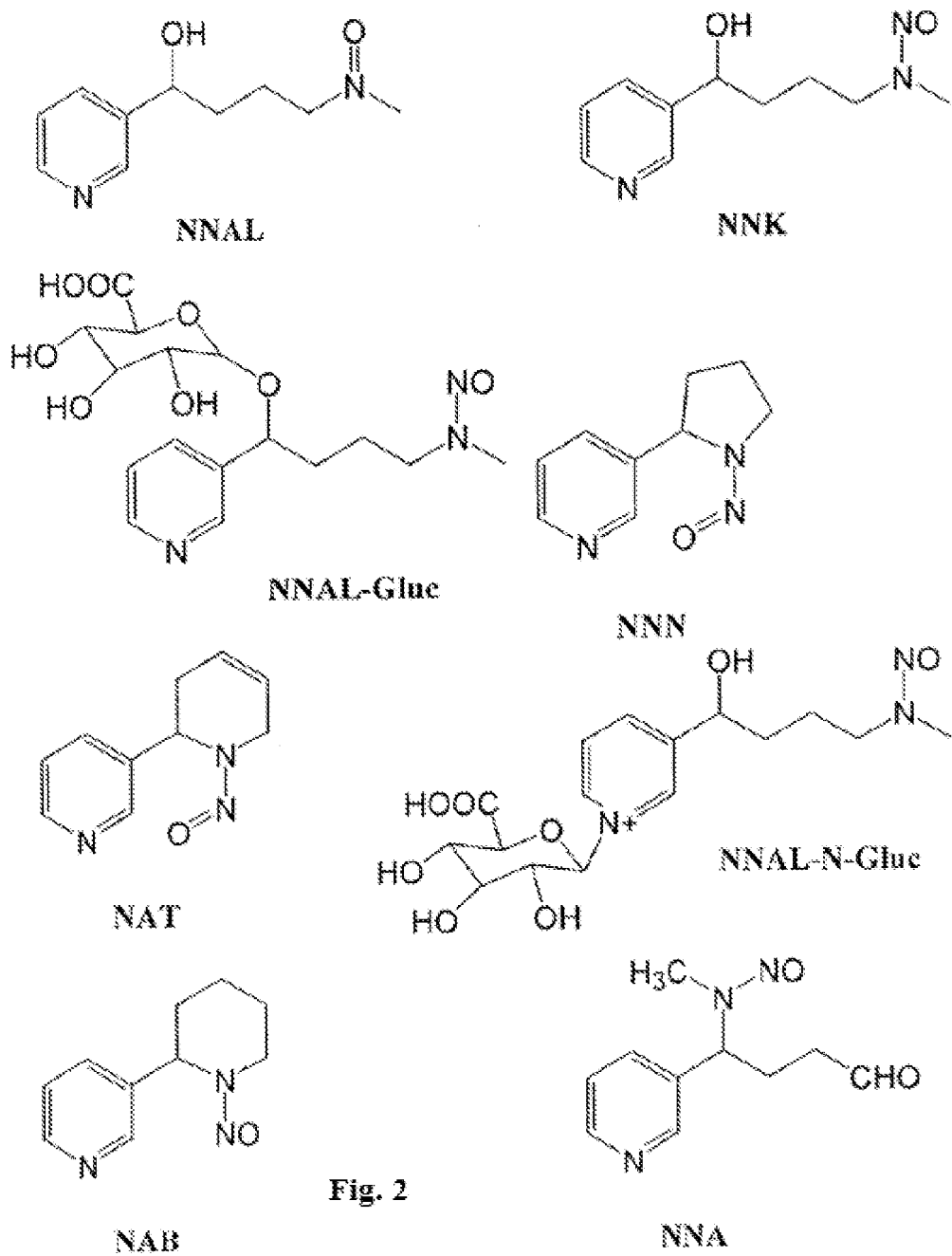
FIG. 2 shows tobacco specific nitrosamines.

The polymerization is performed in the presence of a pore-forming solvent, a porogen. In order to stabilize the electrostatic interactions between the functional monomers and the template compound the porogen is often chosen from among aprotic solvents of low to moderate polarity. Template compounds often exhibit moderate to high solubility in the polymerization media and these, or their structural analogues, can therefore be utilized directly in this standard procedure. While it is possible to use the targeted molecule itself as the template, a structural analog of the target molecule is commonly preferred because: (a) the targeted molecule may be unstable under the polymerization conditions or may inhibit the polymerization; (b) the targeted molecule may not be available in sufficient quantities due to complexity of its synthesis or cost, or both; (c) the template may be insoluble or poorly soluble in the pre-polymerization mixture; (d) the MIP may remain contaminated by low levels of the targeted molecule retained in poorly accessible regions of the polymer matrix, which may bleed from the MIP during use; and/or (e) the target analyte(s) may present a significant health risk and should not be used as a template(s). In the case of nitroso-compounds, particularly the compounds known as TSNAs described below, it is often more convenient to use functional analogues thereof as template compounds. For example, sulfonamide, enamine, or amide, e.g. formamide, derivatives of TSNAs can be template compounds, see FIG. 2 for examples of the same.

Where the MIP is derived using a functional analog of the targeted compound, the functional analogue should be isosteric and preferably also isoelectronic with the targeted compound, or it may contain a substructure of the targeted compound where strong interactions may be likely.

As used herein a "structural analogue" of a molecule is not identical to the orignial molecule, but is in part or whole similar to part or all of the original molecule in terms of molecular shape, electron distribution or other characteristics. Nitroso-containing compounds, particularly nitrosamines, which have the general formula $O=N-N(R1)(R2)$ are among the numerous ingredients of tobacco and tobacco smoke that have been suggested as having a harmful effect on consumers. Of interest for the present invention is the group of nitrosamines that occur naturally in tobacco, TSNAs, see FIG. 2.

Figure 3:
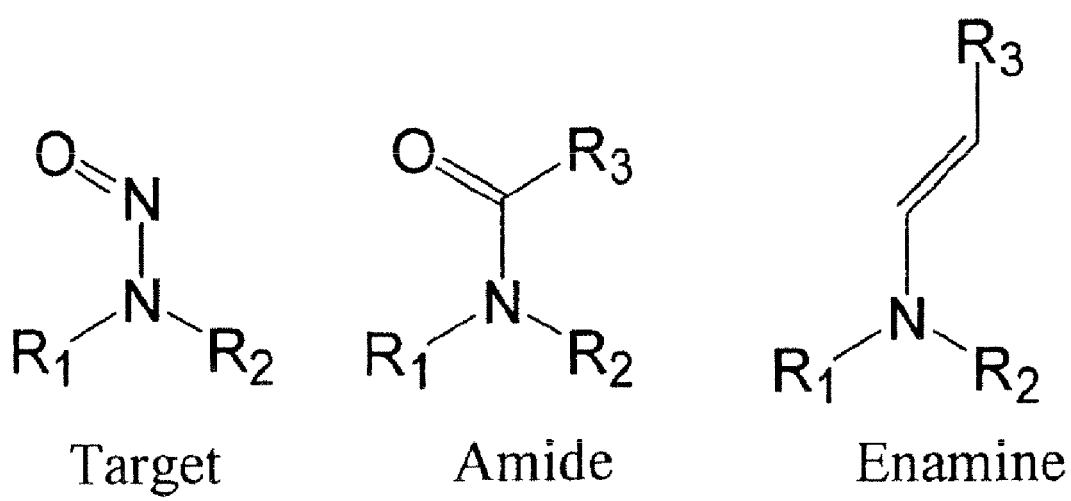
FIG. 3 shows isosteric analogues of nitrosamines.
Figure 3:
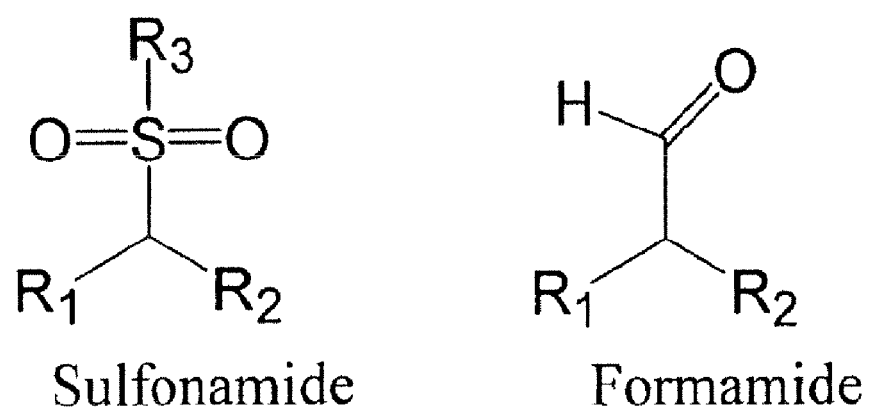

Possible isosteric analogs for the targeting of nitrosamines are seen in FIG. 3. The molecules shown are all derivatives of the parent amine and can be synthesized in a single step from the secondary amine and corresponding aldehyde or acid chloride. Molecular models of the enamine (FIG. 4B) have shown a good steric complementarity with NNAL.

The MIPS described in WO 05/112670 show promising results when used for analysis and extraction of numerous nicotine metabolites from analytical solutions, body fluids, and tobacco materials. However, as TSNAs present a specific and narrow field of interest, investigation as to new ways to recover these compounds from various materials is ongoing. In that regard, MIP formation using new materials and methods has been evaluated.

Design of new MIPS started with choice of a suitable template. As noted above, the template imparts selectivity to the polymer and should ideally be chemically stable, readily available, easy to handle, and impart selective binding properties. As one goal of the invention is to reduce human exposure to nitrosamines they were not potential templates. Instead, formamides, enamines and sulfonamides (see FIG. 2) could be used to replace the nitroso group given their similar geometrics and possession of a partial negative charge in the same position.

Figure 5:
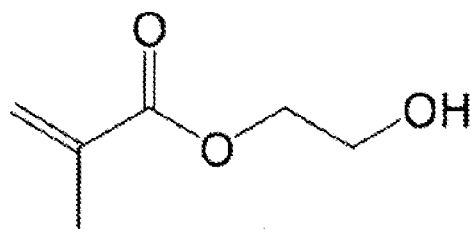
FIG. 5 shows the chemical structure of 2-hydroxyethyl methacrylate.
Figure 6:
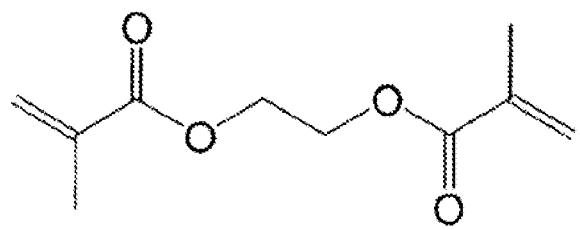
FIG. 6 shows the chemical structure of ethylene glycol dimethacrylate.

The monomer, cross-linker and polymerization conditions (e.g., solvent or porogen, initiator, and temperature) also influence properties of the final MIP. Monomers evaluated were the acidic MAA as well as the neutral monomer 2-hydroxyethylmethacrylate (HEMA), see FIG. 5. The cross-linker, which eventually makes up the bulk of the polymer, also influences whether the polymer is hydrophilic or hydrophobic. Thus the hydrophilic cross-linker PETRA and the hydrophobic EDMA were evaluated, see FIG. 6. For polymerization, both thermal and photochemical initiation were evaluated. Initial experiments indicated that neutral, hydrophobic MIPs imprinted with an enamine or sulfonamide and prepared using UV polymerization showed surprising results. Follow on analysis was conducted which included an acidic and a hydrophilic MIP for comparison, results are summarized below.

Non-Molecularly Imprinted Polymers

The term "non-acidic" includes neutral, alkaline and basic compounds. The monomer precursor of the polymer is non-acidic. It may be alkaline or basic but the use of basic hydrophilic polymers may create difficulties in manufacture, particularly in the formation polymer beads. The monomer precursors of the NIPs are therefore preferably neutral. A compound is normally considered neutral if exists with no net charge and is not capable of donating or accepting a proton, or otherwise has a pH of or in the region of 7 (e.g. 6.5-7.5).

The chemical structures of the NIPs are like that of all cross-linked polymers in that each of the NIPs is composed of a plurality of similar groups of atoms, or moieties, of relatively low molecular weight linked together in a molecular network to form larger molecules of much higher molecular weight. Each moiety corresponds in structure to a material, which is usually used in the production of the polymer but differs therefrom mainly in that an internal bond in the monomer has been rearranged to form bonds between the moieties in the polymer. The NIPs include moieties of at least two kinds, corresponding in structure to a non-acidic monomer and a crosslinker having polar functionality, one of which is hydrophilic, the other being hydrophobic.

Whilst the NIPs can be considered to be non-molecularly imprinted polymers of precursors comprising a monomer and a cross-linker that is polymerizable with the monomer, any description of the NIPs herein by reference to monomers which have structures that correspond to, or are similar or analogous to the moieties from which the NIPs are composed and which are capable of copolymerization should not be interpreted as implying that any particular method or process has been or must be used for the production or preparation of the NIPs.

The two moieties of the NIPs may correspond to a monomer and cross-linker that are capable of copolymerization by any mechanism, including free radical polymerization, such as occurs in the polymerization of unsaturated compounds, or condensation polymerization, such as occurs in the formation of polyesters or polyamides. The monomer will normally contain a single functional group that is capable of polymerization; the crosslinker will normally contain a plurality of functional groups capable of polymerization.

Where the monomer and the cross-linker are unsaturated, the monomer may be mono- or polyunsaturated, usually with unsaturation at a single carbon-carbon double bond. The crosslinker may be polyunsaturated (for example with two-fold or 3, 4, 5-fold or higher unsaturation) usually with unsaturation at two or more carbon-carbon double bonds The unsaturation in the monomer and the crosslinker may each be present separately in the form of an alkenyl or acrylic functional group. Examples of alkenyl functional groups are alkenyl groups having from 1-10 or 1-6 carbon atoms, in particular vinyl, vinylidene, allyl, and isopropenyl groups. Examples of acrylic functional groups are unalkylated and alkylated acryloyl groups such as acrylate, methacylate and ethacrylate groups. For example the monomer may be monoalkenyl and the crosslinker may be di-, tri-, or polyalkenyl.

The hydrophilic and hydrophobic characteristics of the NIPs may be provided by either of their precursors, i.e. either the crosslinker or the monomer. For example the NIPs may be polymers of a non-acidic hydrophilic monomer and a hydrophobic cross-linker. Alternatively the NIPs may be polymers of a non-acidic hydrophobic monomer and a hydrophilic cross-linker.

The hydrophobic and hydrophilic qualities of a compound, e.g. the NIP, the monomer or the cross-linker, reflect the polarity of the molecular structure of the compound, which in turn derives from unequal distribution of electrons between atoms or groups that are situated next to each other in the molecule. If one atom has a higher electronegativity than the other, it attracts a greater share of the electrons in the bond than its neighbour creating an electrical dipole. For example where a carbon atom is bonded to a halogen, oxygen or nitrogen atom, the carbon atom will have a lower share of the electrons, and therefore carry a partial positive charge, and the adjacent atom will carry a partial negative charge. The resulting dipoles within a molecule affect its interaction with other molecules. For example, due to the polar nature of the water molecule ($H_2O$), polar molecules are generally able to dissolve in water and are therefore usually more hydrophilic than non-polar molecules.

The monomer may be hydrophobic or hydrophilic, selected according to the hydrophilic or hydrophobic character of the crosslinker.

In some embodiments the moieties of the cross-linker in the polymer are in molar excess of the moities of the acidic monomer. Thus the molar ratio of the moieties of the cross-linker and non-acidic monomer respectively may be from 3:1 to 10:1, in further embodiments from 4:1 to 6:1.

Monomers having polar functional groups (such as hydroxy, amide, imide, amino, halo, hydroxyalkyl or haloalkyl groups, e.g. C1-C6 hydroxyalkyl groups, ether or ester groups) may be particularly useful in combination with a hydrophobic crosslinker. The monomer may, for example, comprise an acrylic compound, such as acrylamide, methacrylamide, N-methyl acrylamide. The monomer may also be selected from partly-esterified acrylic esters of polyhydric alcohols, such as 2-hydroxyethylmethacrylate (HEMA), glycerol monoacrylate and glycerol monomethacrylate, or from alkenyl compounds having polar functional groups, for example 2-(4-vinylphenyl)-1,3-propane diol. Mixtures of any of the foregoing may also be useful.

In combination with a hydrophilic cross-linker, a non-acidic hydrophobic monomer such as styrene may be useful. Hydrophobic monomers with polar functionality, such as 2-ethyl-hexyl acrylate ("EHA"), butyl methyl acrylate ("BMA"), vinyl pyridine, or methyl methacrylate may be useful.

Thus in one embodiment the non-acidic monomer may be selected from 2-hydroxyethylmethacrylate (HEMA), 2-hydroxypropyl methacrylate, 3-hydroxypropyl methacrylate, glycerol monoacrylate, glycerol monomethacrylate, 2-(4-vinylphenyl)-1,3-propane diol, acrylamide, methacrylamide, N-methyl acrylamide, diethylamino ethylmethacrylate (DEAEM) and mixtures thereof, and the cross-linker may be hydrophobic. In that case the cross-linker may be selected from ethylene glycol dimethacrylate (EDMA), trimethylol propane trimethacrylate ("TRIM"), tetramethylene glycol dimethacrylate, N,N'-methylenebisacrylamide, N,N'-ethylenebisacrylamide, N,N'-butylenebisacrylamide, N,N'-hexamethylenebisacrylamide and mixtures thereof. In a further embodiment the monomer may be selected from styrene, methyl styrene, ethyl styrene, 2-vinyl pyridine, vinyl toluene, ethylhexyl acrylate (EHA), butyl methyl acrylate (BMA), methyl methacrylate and mixtures thereof and the cross-linker may be hydrophilic. In the latter case the cross-linker may be selected from N,N'-methylenebisacrylamide, di(ethylene glycol)dimethacrylate ("DEDMA"), pentaerythritol tetraacrylate, tri(ethylene glycol)dimethacrylate, tetra(ethylene glycol)dimethacrylate, poly(ethylene glycol) dimethacrylate and pentaerythritol triacrylate (PETRA) and mixtures thereof.

In some embodiments the polymer is a copolymer of 2-hydroxyethylmethacrylate (HEMA) and a hydrophobic crosslinker, e.g. copolymer of 2-hydroxyethylmethacrylate (HEMA) and ethylene glycol dimethacrylate (EDMA). It may also be a copolymer of 2- or 3-hydroxypropylmethacrylate (HEMA) and a hydrophobic crosslinker e.g. a copolymer of 2 or 3-hydroxypropylmethacrylate (HEMA) and ethylene glycol dimethacrylate (EDMA).

In one embodiment, the monomer is a non-acidic monomer other than HEMA. In another embodiment, the monomer comprises a combination of HEMA and at least one other polymerizable monomer, such as any of the monomers listed above.

The crosslinker may be monomeric or polymeric. It may be hydrophobic or hydrophilic, selected according to the hydrophilic or hydrophobic character of the monomer. It preferably has at least some polar functionality. Crosslinkers containing at least one polar functional group per molecule (such as an hydroxyl, amide, amino, imide, ether, ester hydroxyalkyl or haloalkyl, e.g. C1-C6 hydroxylalkyl or haloalkyl group may be useful. For example, the crosslinker may be an acrylic compound, such as an acrylic ester, in particular a polyacrylic ester of a polyhydric alcohol such as EDMA or trimethylol propane trimethacrylate ("TRIM"), tetramethylene glycol dimethacrylate, di(ethylene glycol)dimethacrylate ("DEDMA") or pentaerythritol tetraacrylate. Acrylic amides such as N,N'-methylenebisacrylamide, N,N'-ethylenebisacrylamide, N,N'-butylenebisacrylamide, and N,N'-hexamethylenebisacrylamide may be useful. The aforementioned crosslinkers range from moderately hydrophobic, e.g. EDMA and TRIM, to hydrophilic, e.g. DEDMA, depending on the number and type of polar functional groups per molecule. Other hydrophilic crosslinkers of possible use include tri(ethylene glycol)dimethacrylate, tetra(ethylene glycol)dimethacrylate, poly(ethylene glycol)dimethacrylate and pentaerythritol trihacrylate (PETRA). Mixtures of the foregoing crosslinkers may also be used.

In one embodiment, the crosslinker is a compound other than EDMA.

In another embodiment, the crosslinker comprises a combination of EDMA and at least one other crosslinker, such as the crosslinkers listed above.

The non-molecularly imprinted copolymer of 2-hydroxyethylmethacrylate (HEMA), which is neutral, and ethylene glycol dimethacrylate (EDMA) is of particular interest. Other NIPs of interest include the following:

(i) non-molecularly imprinted polymers of HEMA and a crosslinker selected from TRIM, tetramethylene glycol dimethacrylate, pentaerythritol tetraacrylate, N,N'-methylenebisacrylamide, N,N'-ethylenebisacrylamide, N,N'-butylenebisacrylamide, N,N'-hexamethylenebisacrylamide and DEDMA, and (ii) non-molecularly imprinted polymers of a monomer selected from acrylamide, methacrylamide, N-methyl acrylamide, glycerol monoacrylate, glycerol monomethacrylate, 2-(4-vinylphenyl)-1,3-propane diol, methyl methacrylate ("MMA"), N-vinyl pyrrolidone ("NVP"), diethylamino ethyl methacrylate ("DEAEM"), styrene, ethyl hexyl acrylate ("EHA"), butyl methacrylate ("BMA") and vinyl pyridine, and a crosslinker selected from EDMA, TRIM, tetramethylene glycol dimethacrylate, pentaerythritol tetraacrylate, N,N'-methylenebisacrylamide, N,N'-ethylenebisacrylamide, N,N'-butylenebisacrylamide, N,N'-hexamethylene-bisacrylamide, DEDMA tri(ethylene glycol)dimethacrylate, tetra(ethylene glycol)dimethacrylate, poly(ethylene glycol) dimethacrylate and pentaerythritol triacrylate (PETRA).

Polymerization may be carried out in the presence of a porogen solvent e.g. chloroform, toluene, acetonitrile or acetonitrile/toluene. The porosity of the material may be such that it has a B.E.T. surface area in any range having an upper limit of for example 1200, 1000, 800, 600, 500 or 400 $m^2/g$, and a lower range of for example 100, 200, 300, 400 500 or 600 $m^2/g$. The surface area may, for example, fall into any of the following ranges, 200-1000, 300-800, 300-600, or 200-500 $m^2/g$.

The monomer, cross-linker and polymerization conditions (e.g. solvent or porogen, initiator and temperature) may influence the physical and chemical properties of the NIPs. Thus, if the hydrophobic precursor makes up the bulk of the polymer, the polymer will usually also be hydrophobic. Without wishing to be limited by any theory, the use of a combination of precursors that are hydrophilic and hydrophobic may act to balance the hydrophilic properties of one precursor against the hydrophobic properties of the other and thereby influence the adsorption of nitroso compounds by the polymer and the selectivity of the polymer towards nitroso compounds over nicotine. The selectivity of the NIPs may also be affected by the presence of polar functional groups in the monomer and cross linker. Typical polar functional groups include hydroxyl, ester, carboxyl, amide, imide and ether groups.

The presence of one or more polar functional groups in both the monomer and the cross liker may also be desirable provided that the polar group in the hydrophobic precursor does not suppress the hydrophobic property of the precursor.

The NIPs may be prepared by co-polymerising the functional monomer (or monomers) and the cross-linker (or cross linkers) under suitable reaction conditions, for example, by block polymerization, emulsion polymerization or suspension polymerization. The polymerization may be initiated thermally, photochemically (e.g. by UV light) or by any method appropriate for the materials and process used.

Where block polymerization is used, the resulting solid material is typically crushed and sieved to obtain a desired size fraction of particulate material. When prepared by either suspension or emulsion polymerization methods, crushing and sieving are unnecessary since the particle size can be controlled within the desired limits during the polymerization process.

The NIPs may be in any solid suitable form suitable for the use for which they are intended, for example granules, powder, beads, monoliths, moulded articles, fibres, papers or cloths By way of explanation and not of limitation, the invention will be further described in more detail with reference to a number of examples. The invention refers to template molecules, polymer materials designed to bind TSNAs present in organic or aqueous systems, and finally use of said materials in, for example, analytical or preparative separations, in chromatography, for analytical sample pre-treatment, and in chemical sensors. Unless otherwise described, materials are commercially available or can be prepared by conventional techniques.

Example 1

Preparation of MIPs for Evaluation

Twelve different MIPS were prepared which represented all possible combinations of three templates (formamide, enamine, and sulfonamide), two monomers (acidic and neutral), and two cross-linkers (hydrophilic and hydrophobic). Using a 1:1 mixture of N-nitrosopiperidine and (−)-nicotine in water the MIPs were evaluated. Non-imprinted reference polymers were also generated and evaluated under like conditions. Results are summarized in FIG. 7. Examples of the preparation of enamine and pyridine carbinol templates as well as further description of methods which can be used for the purposes of the present invention can be found in WO 05/112670.

As is evident from FIG. 7, MIPs using acidic monomers bind large amounts of nicotine. For applications where TSNAs are to be screened out while nicotine levels should remain unaffected, then, such a monomer is less favored. In addition, it is evident that MIPs with a hydrophobic cross-linker are better at binding nitrosamine than hydrophilic MIPs.

Example 2

Preparation of MIPs for Analytical Comparison

In view of the surprisingly positive performance of neutral, hydrophobic MIPs as summarized in FIG. 7, the neutral, hydrophobic MIPs imprinted with enamine or sulfonamide templates and polymerized using UV were selected for further analysis. For comparison, the best-performing hydrophilic MIP was also included in the sample. Seven MIPs were prepared using the parameters summarized in Table 1.

TABLE 1

| Name  | Template | Monomer | Cross-Linker |
|-------|----------|---------|--------------|
| MIP 1 | (enamine-piperidine structure) | HEMA | EDMA |
| MIP 2 | (enamine-piperidine structure) | HEMA | PETRA |
| MIP 3 | (sulfonamide-piperidine structure) | HEMA | EDMA |
| MIP 4 | NNAL analogue | HEMA | EDMA |
| MIP 5 | NNAL analogue | HEMA | EDMA |
| MIP 6 | (pyridine-sulfonamide structure) | HEMA | EDMA |
| MIP 7 | (pyridine-enamine structure) | HEMA | EDMA |

Example 3

Evaluation of Selected MIPs with TSNA/Nicotine Mixtures

Figure 9:
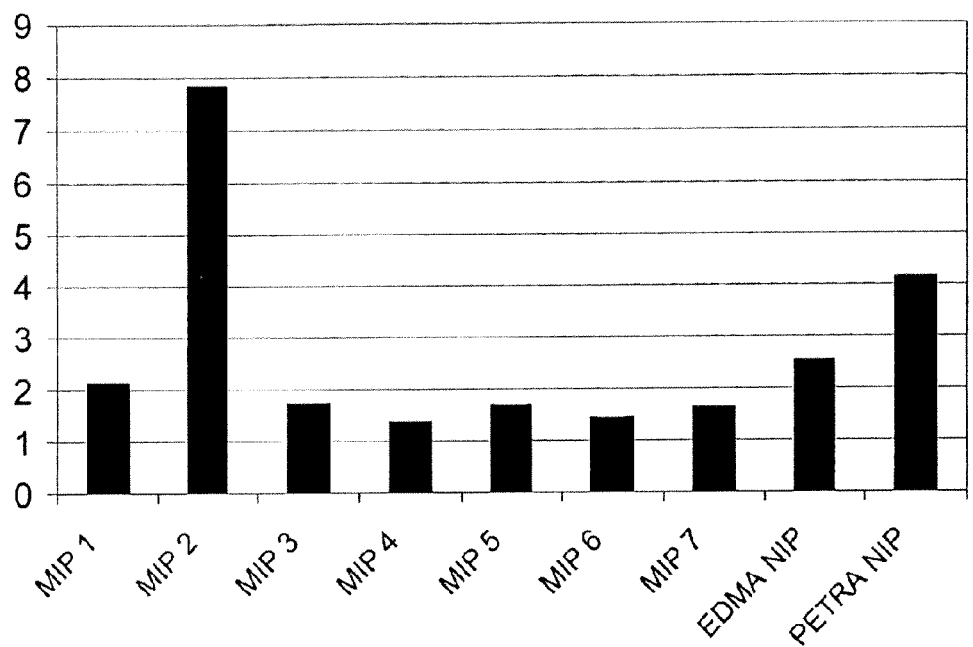
FIG. 9 shows percentage of TSNAs released upon a water wash.

SPE columns were prepared, each containing 25 mg of MIPs 1-7. To each column 1 ml of aqueous solution containing 0.30 pg/ml total TSNA and 0.2 µg/ml nicotine was added. HPLC was used to determine the amount of TSNA that had not been extracted in each column, allowing for calculation of the extracted material, see FIG. 8. 1 ml of water was then passed through each column and the amount of TSNA released, if any, was determined see FIG. 9. Each of FIGS. 8 and 9 represent the average of two experiments.

Figure 10:
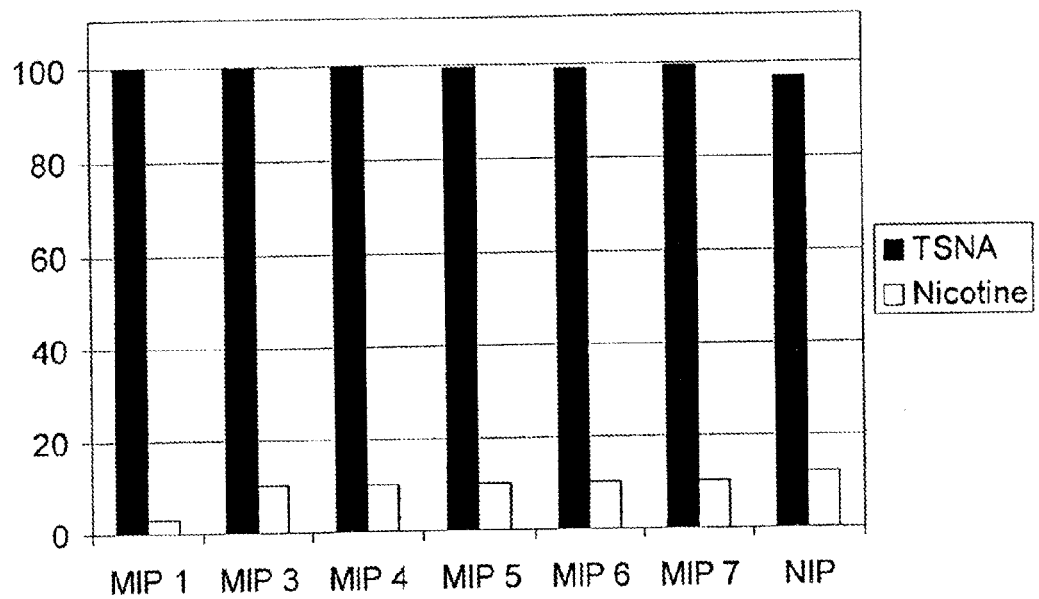
FIG. 10 shows percentage of TSNAs and nicotine extracted from aqueous solution.
Figure 11:
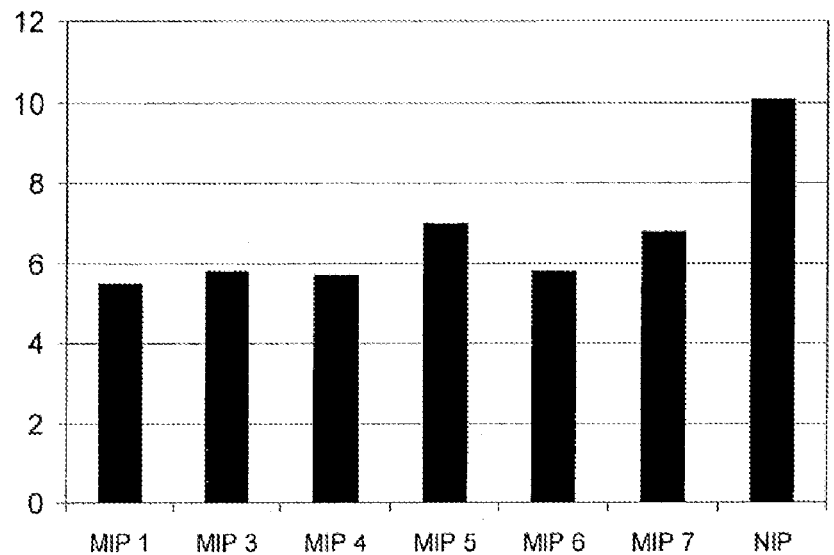
FIG. 11 shows percentage of TSNAs released upon a water wash.
Figure 12:
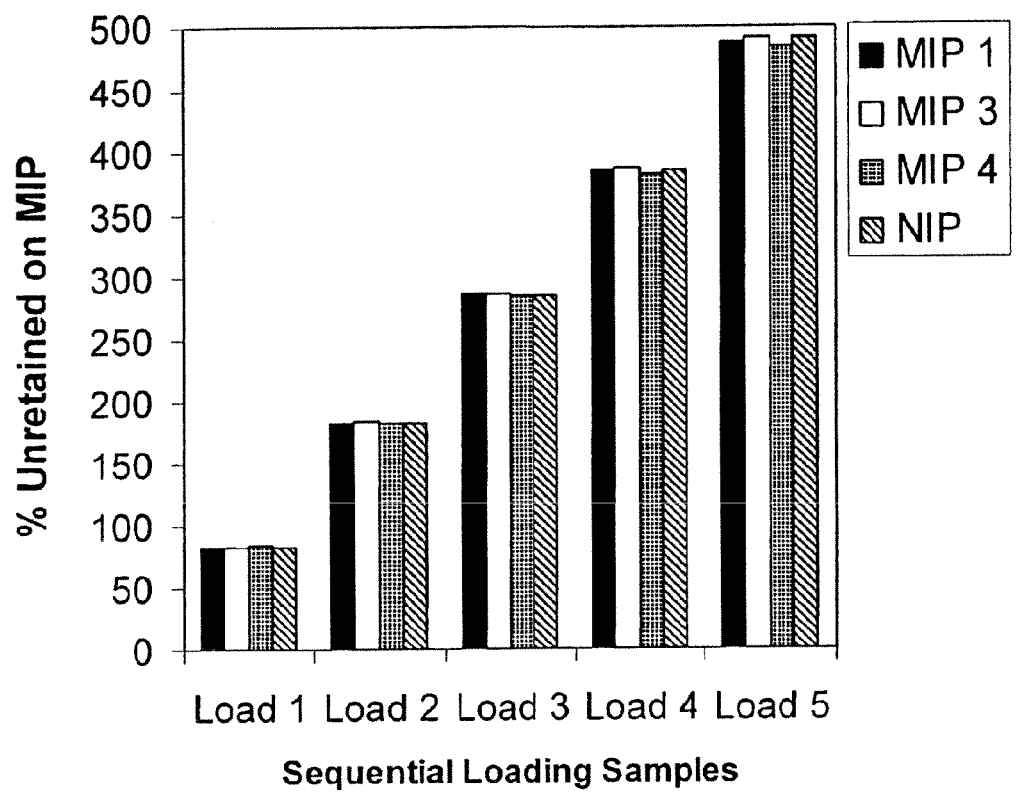
FIG. 12 shows the percentage of nicotine unretained after five separate sample loads.
Figure 13:
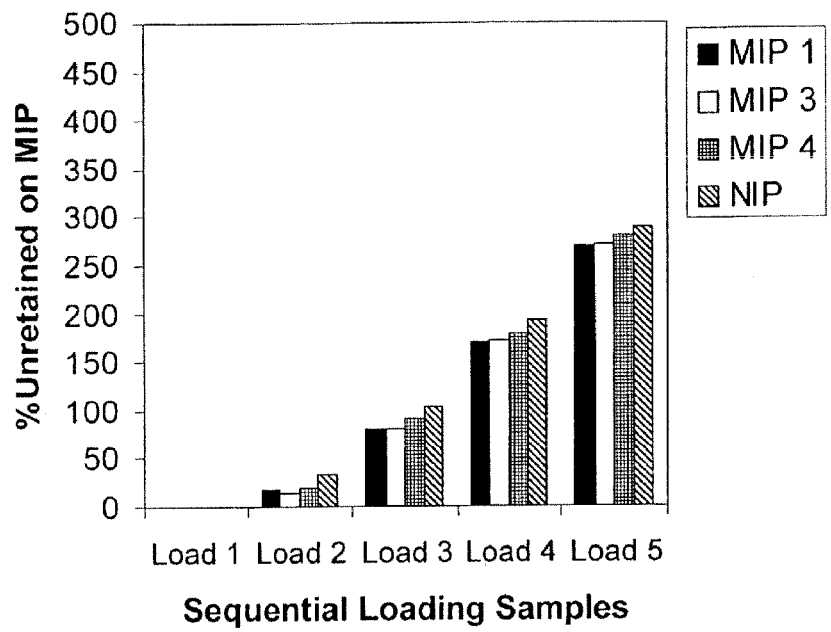
FIG. 13 shows the percentage of NNN unretained after five separate sample loads.
Figure 14:
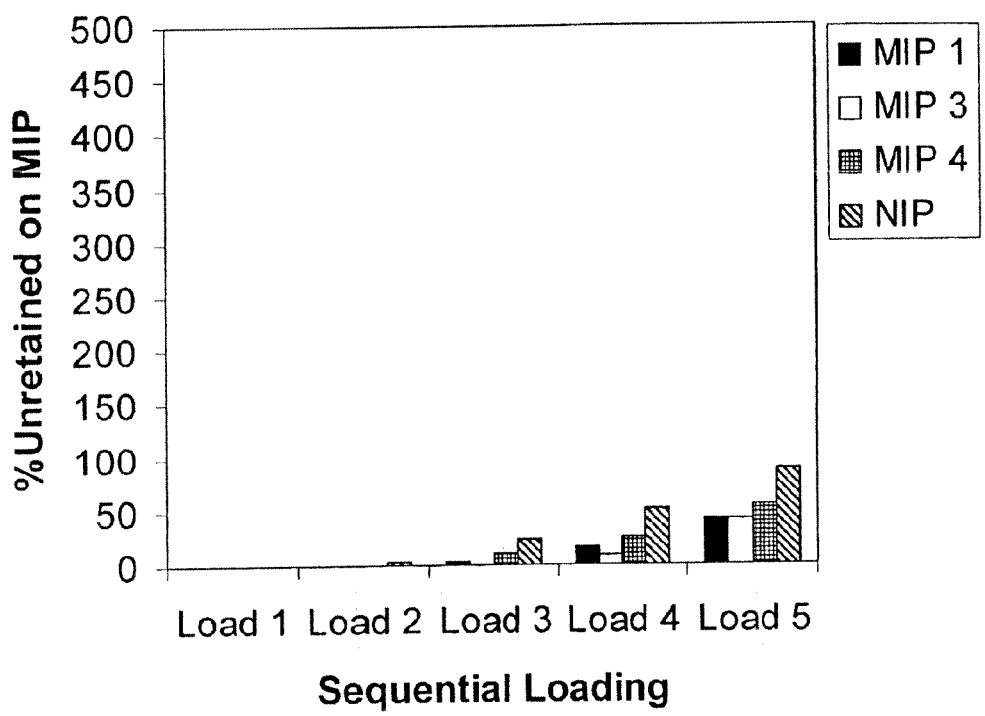
FIG. 14 shows the percentage of NNK unretained after five separate sample loads.
Figure 15:
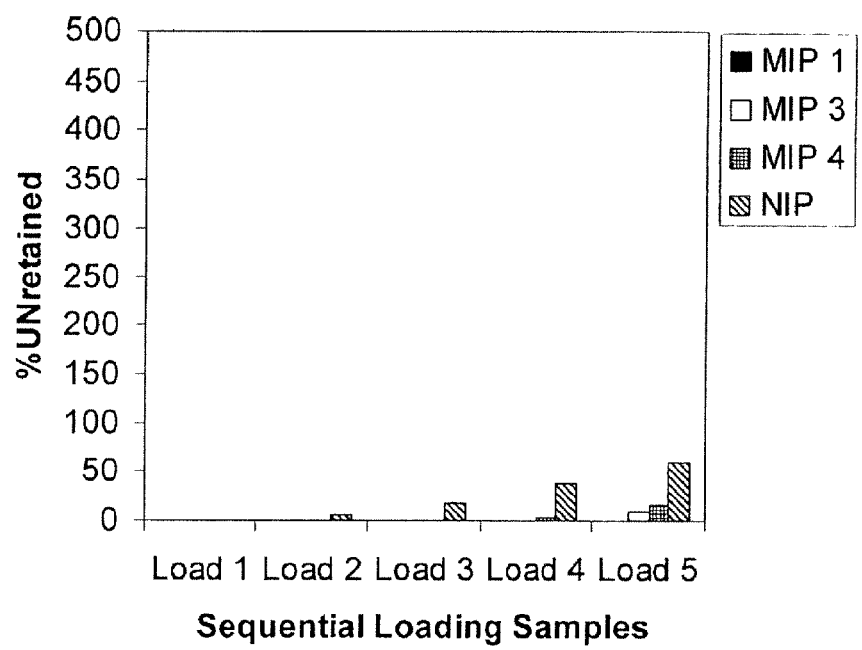
FIG. 15 shows the percentage of NAT unretained after five separate sample loads.
Figure 16:
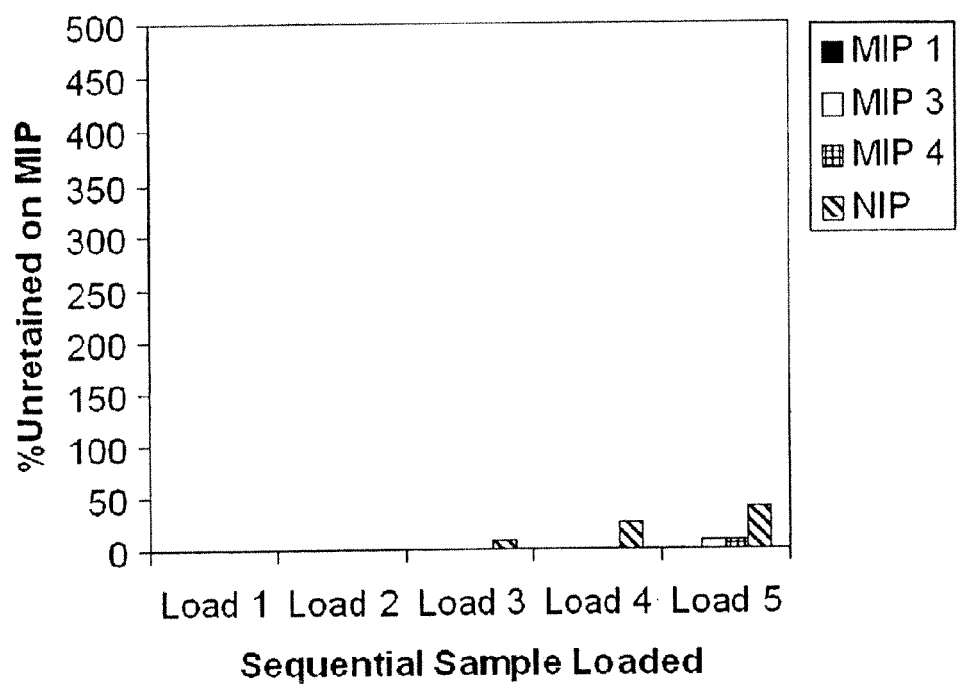
FIG. 16 shows the percentage of NAB unretained after five separate sample loads.

Based on the strong performance of the hydrophobic, neutral MIPs, the evaluation for MIPs 1 and 3-7 was repeated using 1 ml of test solution containing 0.30 µg/ml total TSNA and 4 µg/ml nicotine in pH 6.3 phosphate buffer (ionic strength 0.09). Results are shown in FIGS. 10 and 11, where both represent an average of two experiments. As can be seen, MIPs 1, 3, and 4 performed best by retaining 100% of the TSNA while allowing most of the nicotine to pass unencumbered.

The performance of MIPs 1, 3, and 4 was also evaluated at pH 5.3 and 7.3. As pH increased, retention of nicotine increased from approximately 10% to 30%, indicating that where nicotine is not to be affected, optimal performance is attained using slightly acidic pH. An acidic MIP formed using the acidic monomer MAA and the hydrophobic cross-linker EDMA was also evaluated using the same conditions at pH 6.3, it retained about 90% of the nicotine.

Regeneration of the MIPs was performed using a 0.5% TFA in MeOH wash. Other acid/alcohol mixtures may be used as well.

Example 4

Evaluation of Select MIPs with Specific TSNAs and Nicotine

After finding the surprisingly positive performance of MIPs 1, 3, and 4 in the above-described experiments, a further evaluation was conducted. SPE columns were prepared with 25 mg of ground MIP and five loads of test solution at 1 ml each were loaded on the columns. The test solution was ca. 80 µg/ml each of NNN, NNK, NAT, 40 µg/ml NAB and 4 pg/ml nicotine in pH 6.3 phosphate buffer (ionic strength 0.09). After loading each sample the amount of unretained nicotine and each TSNA was determined using HPLC. A control non-imprinted polymer was also evaluated. Results are shown in FIGS. 12-16. As seen in the figures, about 10% of the nicotine is bound by the MIPs in the first loading step. This saturates the MIP with nicotine and adding more sample on the column does not result in a further significant retention of nicotine. NNN is most weakly bound to the MIP and breakthrough is seen in the second loading step. Each of MIPs 1, 3, and 4 is excellent at retaining NNK, NAB, and NAT. Thus, the combination of neutral functional monomer, enamine or sulfonamide template, and hydrophobic cross-linker results in a surprisingly high retention of TSNA from a mixed sample while retaining only a minimal amount of nicotine.

Such MIPs are particularly attractive for applications where TSNAs are to be removed from a sample but nicotine should not be affected, such as treatment of tobacco or tobacco smoke to remove TSNAs. In addition, such MIPs can be utilized in an analytical capacity to measure the amount of TSNA is a sample of a product or a sample from a patient. In such cases, if nicotine is a component of interest the amount of nicotine retained by the MIP can be quantified and other methods, for example, nicotine-specific MIPs can be used to quantify the remaining amount of nicotine in the sample. The further step of evaluating nicotine levels could be done prior or subsequent to use of the TSNA specific MIPs of the present invention.

Example 5

Preparation of NIPs for Evaluation

Three samples of each of four different NIPs are prepared using two monoalkenyl monomers methacrylic acid (MAA), which is acidic, and 2-hydroxyethylmethacrylate (HEMA), which is neutral, and two cross-linkers (in this instance di- or trialkenyl monomers) namely pentaerythritol triacrylate (PETRA), which is hydrophilic, and ethylene glycol dimethacrylate (EDMA) which is hydrophobic. No template material was present in the polymerization that would molecularly imprint the polymer.

For each combination, a pre-polymerization solution is prepared by dissolving the monoalkenyl monomer, the cross-linker and a free-radical initiator such as 2,2'-azo bis(2-methyl propionitrile) (AIBN) in chloroform or other aprotic solvent. The solution is transferred to a polymerization vessel and sealed. Polymerization is initiated at 70° C., and maintained at this temperature for 24 hours. The resulting NIP is coarsely crushed, extracted first with methanol: acetic acid 4:1 and then with methanol to remove any unreacted monomers, and dried.

Example 6

Use of NIPs in the Selective Adsorption of a Nitrosamine

The performances of the NIPs of Example 5 in the selective adsorption of a nitrosamine relative to nicotine can be evaluated by treating a 1:1 test mixture of N-nitrosopiperidine and nicotine in water with the different NIPs. Results are summarized in Table 1, which gives averages for the three absorption experiments for the three samples of each NIP.

TABLE 1

| Monomer | Cross-linker | % nitrosamine adsorbed | % nicotine adsorbed |
|---|---|---|---|
| MAA (acidic) | PETRA (hydrophilic) | 39 | 48 |
| HEMA (neutral) | PETRA (hydrophilic) | 41 | 9 |
| MAA (acidic) | EDMA (hydrophobic) | 84 | 28 |
| HEMA (neutral) | EDMA (hydrophobic) | 84 | 6 |

As is apparent from Table 1, the non-molecularly imprinted polymers prepared from the hydrophobic cross-linker bind significantly more of the nitrosamine than the NIPs prepared from the hydrophilic cross-linker, and the NIPs prepared from the neutral monomer and the hydrophobic cross-linker are more selective for the nitrosamine, relative to the nicotine, than the NIPs prepared from the acidic monomer and the hydrophobic cross-linker.

Example 7

Further Comparison of NIPs

In view of the surprisingly positive performance of non-acidic, hydrophobic NIPs as summarized in Table 1, the NIP prepared from the neutral monomer HEMA and the hydrophobic cross-linker EDMA (NIP 1) was compared with a non-molecularly imprinted polymer prepared from the neutral monoalkenyl monomer HEMA and the hydrophilic trialkenyl monomer pentaerythritol triacrylate (PETRA) (NIP2).

Two SPE columns were prepared, one containing 25 mg of NIP1 ground and sieved to 20-90 µm, the other 25 mg of NIP2 ground and sieved to 20-90 µm. To each column, 1 ml of aqueous solution containing approximately 80 ng/ml each of NNN, NNK, NAT, 40 ng/ml NAB and 0.2 mg/ml nicotine was added. HPLC was used to determine the amount of TSNA that had not been extracted in each column, allowing for calculation of the extracted material.

1 ml of water was then passed through each column and the amount of TSNA released, if any, was determined Table 2 summarizes the results, which are the average of two experiments.

TABLE 2

| Sample | Nicotine | NNN | NNK | NAT | NAB |
|---|---|---|---|---|---|
| | % extracted | | | | |
| NIP1 (HEMA/EDMA) | 23 | 99 | 100 | 99 | 100 |
| NIP2 (HEMA/PETRA) | 22 | 97 | 100 | 100 | 100 |

TABLE 2-continued

| Sample | Nicotine | NNN | NNK | NAT | NAB |
|---|---|---|---|---|---|
| | % released on water wash | | | | |
| NIP1 (HEMA/EDMA) | 7 | 9 | 0 | 0 | 0 |
| NIP2 (HEMA/PETRA) | 10 | 14 | 0.5 | 0 | 0 |

The data in Table 2 indicates a low level of release of the TSNAs from the NIPs upon washing with water and this is surprising in view of the absence of molecular imprinting. What is more, the retention of TSNAs by the NIPs appears to be stronger than their retention of nicotine.

Regeneration of the NIPs can be performed by washing the NIP with a mixture of acidic and alcoholic solvents, such as a 0.5% solution v/v of trifluoroacetic acid (TFA) in methyl alcohol.

Example 8

Evaluation of NIPs with Specific TSNAs and Nicotine

The efficacy of NIPs as selective adsorbents of TSNAs is demonstrated in the following experiment. An SPE column is prepared with 25 mg of ground and sieved NIP and 5 ml of a test solution are loaded on the column in five successive loads of 1 ml. The test solution contains approximately 80 ng/ml each of NNN, NNK, NAT, 40 ng/ml NAB and 4 mg/ml nicotine in pH 6.3 phosphate buffer (ionic strength 0.09). After loading each sample, the unretained amounts of nicotine and each TSNA (i.e. the percentage of each constituent in each load that passes through the column) are determined using HPLC. Results are shown in Table 3 in which the amount of each constituent not retained on the column in each 1 ml load is expressed as a percentage of the total amount of each constituent.

TABLE 3

| | % sample not retained on column | | | | |
|---|---|---|---|---|---|
| Load No | 1 | 2 | 3 | 4 | 5 |
| Nicotine | 82 | 99 | 100 | 100 | 100 |
| NNN | 0 | 33 | 71 | 88 | 97 |
| NNK | 0 | 3 | 21 | 28 | 36 |
| NAB | 0 | 5 | 12 | 21 | 22 |
| NAT | 0 | 1 | 9 | 15 | 16 |

As seen from the Table, decreasing amounts of the nicotine are bound by the NIP in successive loading steps. The first steps saturate the NIP with nicotine. Progressively less nicotine is retained in successive loads.

Amongst the TSNAs, NNN is most weakly bound to the NIP, though significantly more strongly than nicotine. Although no NNN passes through the column in the first loading step, progressively more of the sample is passed through the column after the second loading step. The NIP performs better in retaining NNK, NAB, and NAT. Thus, the combination of neutral functional monomer and hydrophobic di- or polyolefinic monomer results in a surprisingly high retention of TSNA from a mixed sample while retaining only a minimal amount of nicotine.

Example 9

Use of a MIP or NIP in the Treatment of Tobacco Extracts

The MIP or NIP polymer produced according to the parameters described above can be incorporated into a SPE column and the column can be conditioned as necessary.

Neutral functional monomers used in the polymer could be, for example, HEMA, acrylamide, methacrylamide, N-methacrylamide, glycerol monoacrylate, glycerol monomethacrylate, or 2-(4-vinylphenyl)-1,3-propanediol.

Hydrophobic cross-linkers could be, for example, EDMA, TRIM, DVB, m-diisopropenylbenzene, tetramethylene glycol dimethacrylate, pentaerythrithol tetraacrylate, N,N' Methylenebisacrylamide, N,N'-Ethylenebisacrylamide, N,N' Buthylenebisacrylamide, or N,N-Hexamethylenebisacrylamide.

Further applicable materials are known, see, for example, *Molecularly Imprinted Material*: Science and Technology, Yan, M; Ramstrom, 0; Eds., Marcel Dekker, New York, 2005.

Cut or shredded tobacco leaf can be extracted with water for 15-25 minutes at 60° C. The tobacco is separated from the solution by filtration and dried. The solution is passed through the SPE column and TSNA is absorbed from the extract. The column is then drained and the solution concentrated by film evaporation, the concentrate is then recombined with the extracted tobacco and dried in air. Performance of the MIP or NIP can be evaluated by eluting bound compounds from the MIP or NIP using 2×1 ml methanol containing 0.5% TFA and extract analyzed using HPLC-UV.

Example 10

Use of a MIP or NIP in the Treatment of Tobacco Extracts

Using a continuous extraction process, US Blend-type shredded tobacco leaf is loaded into a first extraction chamber into which super-critical carbon dioxide is fed. After contacting the tobacco, the carbon dioxide is fed into a second extraction chamber containing a MIP or NIP according to the invention. Having contacted the polymer, the carbon dioxide is returned to the first extraction chamber and contacted again with the tobacco. The cyclic process is continued until the TSNA content of the tobacco has been reduced to a desired level, whereupon the carbon dioxide is vented from the system, and the tobacco removed from the first chamber. The MIP or NIP in the second chamber is then regenerated for reuse.

Example 11

Use of an MIP or NIP for Sample Analysis

A SPE column is prepared by adding 25 mg of MIP or NIP according to the invention. A test sample is added to the column, for example 5 ml of human urine potentially containing TSNAs. The sample is allowed to pass through the column, which would then be subjected to vacuum to remove all liquid and ensure the MIP or NIP material is dry. A wash may be conducted to remove any interfering compounds that may have non-specifically associated with the MIP, for example 1 ml distilled water. After drying the TSNAs can be recovered from the MIP or NIP using, e.g., 1 ml DCM and quantified using HPLC.

Example 12

Use of an MIP or NIP in Smoking Articles

Figure 17:
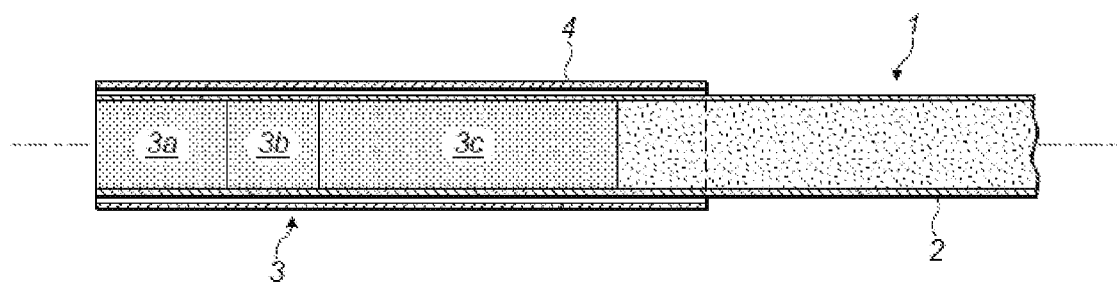
FIG. 17 is a side elevation, partly longitudinal cross-section and partially broken away view of a smoking article with a smoke filter according to the invention.
Figure 18:
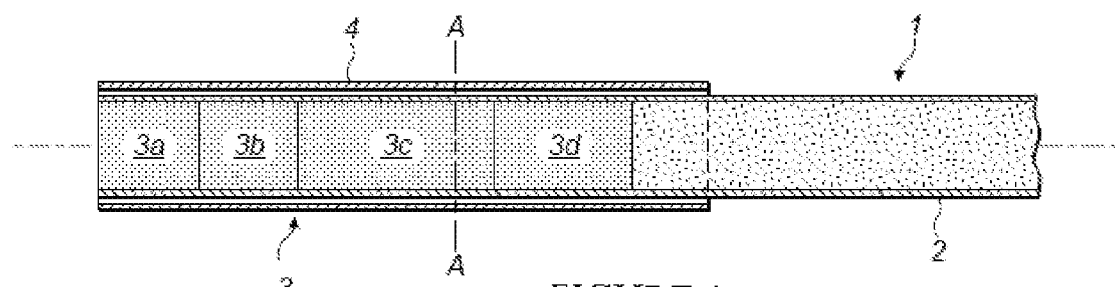
FIG. 18 is a similar view to FIG. 17 of a smoking article with an alternative smoke filter according to the invention.

Referring to the drawings, FIGS. 17 and 18 illustrate smoking articles in the form of cigarettes having a rod 1 of tobacco encased in a wrapper 2 attached to a smoke filter 3 by means of a tipping paper 4. For clarity, the tipping paper 4 is shown spaced from the wrapper 2, but in practice they lie in close contact.

In FIG. 17, the smoke filter 3 comprises three cylindrical filter elements 3a, 3b, 3c. The first filter element 3a at the mouth end of the filter is 7 mm in length, composed of cellulose acetate tow impregnated with 7% by weight of triacetin plasticizer having a 25 mm water gauge pressure drop over its length. The second filter element 3b, positioned centrally is a cavity 5 mm in length containing 150 mg of activated carbon granules. The third filter element 3c adjacent the rod 1 is 15 mm in length, has a 90 mm water gauge pressure drop over its length, and comprises 80 mg cellulose acetate tow. The tow is impregnated with 4% by weight of triacetin and has 80 mg of MIP or NIP specific for TSNAs as described herein, distributed evenly throughout its volume in a "Dalmatian" style. The cigarette shown in FIG. 18 is similar to that of FIG. 17 except that the smoke filter 3 has four coaxial, cylindrical filter elements 3a, 3b, 3c and 3d. The first filter element 3a at the mouth end of the cigarette is 5 mm in length, and composed of cellulose acetate tow impregnated with 7% by weight of triacetin plasticizer. The second filter element 3b, positioned adjacent the first filter element 3a is a cavity 5 mm in length containing 200 mg of MIP specific for TSNAs, produced as described herein. The third filter element 3c adjacent the second filter element 3b is 10 mm in length and comprises cellulose acetate tow impregnated with 7% by weight of triacetin. The fourth filter element 3d lies between the third filter element 3c, is 7 mm in length and comprises 80 mg of granular activated carbon. A ring of ventilation holes 5 is formed in the tipping paper 4 in a radial plane A-A which deliver air into the third filter element 3c about 3 mm downstream of the junction with the fourth filter element 3d when smoke is inhaled through the cigarette.

Example 13

Use of a NIP or MIP in the Treatment of Tobacco Extracts

NIPs or MIPs produced as described above can be incorporated into a SPE column and the column can be conditioned in a manner that will be known to those skilled in the art. Cut or shredded tobacco leaf is extracted with water for 15-25 minutes at 60° C. The tobacco is separated from the solution by filtration and dried. The solution is passed through the SPE column and TSNA is absorbed from the extract. Optionally water is passed through the column and combined with the treated extract. The column is then drained and the solution concentrated by film evaporation, the concentrate is then recombined with the extracted tobacco and dried in air. Performance of the NIP or MIP can be evaluated by eluting bound compounds from the NIP or MIP using 2×1 ml methanol containing 0.5% TFA and extract analyzed using HPLC-UV.

Example 14

Use of NIPs or MIPS in the Treatment of Tobacco Extracts

Using a continuous extraction process, US Blend-type shredded tobacco leaf is loaded into a first extraction chamber into which super-critical carbon dioxide is fed.

After contacting the tobacco, the carbon dioxide is fed into a second extraction chamber containing a NIP or MIP. Having contacted the polymer, the carbon dioxide is returned to the first extraction chamber and contacted again with the tobacco. The cyclic process is continued until the TSNA content of the tobacco has been reduced to a desired level, whereupon the carbon dioxide is vented from the system, and the tobacco removed from the first chamber. The NIP or MIP in the second chamber is then regenerated for reuse.

Example 15

Use of NIPs or MIPs for Sample Analysis

A SPE column is prepared by adding 25 mg of NIP or MIP. A test sample is added to the column, for example 5 ml of human urine potentially containing TSNAs. The sample is allowed to pass through the column, which would then be subjected to vacuum to remove all liquid and ensure the NIP or MIP material is dry. A wash may be conducted to remove any interfering compounds that may have non-specifically associated with the NIP or MIP, for example 1 ml distilled water. After drying the TSNAs can be recovered from the NIP or MIP using, e.g., 1 ml DCM and quantified using HPLC.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for removing nitrosamine from material containing nitrosamine, said method comprising contacting the material with an adsorbent non-molecularly imprinted polymer of a non-acidic monomer and a cross-linker having polar functionality, one of which is hydrophilic, the other of which is hydrophobic.

2. The method of claim 1, wherein the non-acidic monomer is selected from 2-hydroxyethylmethacrylate (HEMA), 2-hydroxypropyl methacrylate, 3-hydroxypropyl methacrylate, glycerol monoacrylate, glycerol monomethacrylate, 2-(4-vinylphenyl)-1,3-propane diol, acrylamide, N-methyl acrylamide and mixtures thereof, and the cross-linker is hydrophobic.

3. The method of claim 2, wherein the cross-linker is selected from ethylene glycol dimethacrylate (EDMA), trimethylol propane trimethacrylate ("TRIM"), tetramethylene glycol dimethacrylate, N,N'-methylenebisacrylamide, N,N'-ethylenebisacrylamide, N,N'-butylenebisacrylamide, N,N'-hexamethylenebisacrylamide and mixtures thereof.

4. The method of claim 1, wherein the non-acidic monomer is selected from styrene, methyl styrene, ethyl styrene, 2-vinyl pyridine, vinyl toluene, ethylhexyl acrylate (EHA), butyl methyl acrylate (BMA), methyl methacrylate and mixtures thereof and the cross-linker is hydrophilic.

5. The method of claim 1, wherein the cross-linker is selected from N,N'-methylenebisacrylamide, di(ethylene glycol) dimethacrylate ("DEDMA"), pentaerythritol tetraacrylate, tri(ethylene glycol) dimethacrylate, tetra(ethylene glycol) dimethacrylate, poly(ethylene glycol) dimethacrylate and pentaerythritol triacrylate (PETRA) and mixtures thereof.

6. The method of claim 1, wherein the polymer is a copolymer of 2-hydroxyethylmethacrylate (HEMA) and a hydrophobic crosslinker.

7. The method of claim 1, wherein the polymer is a copolymer of 2-hydroxyethylmethacrylate (HEMA) and ethylene glycol dimethacrylate (EDMA).

8. The method of claim 1, wherein the polymer is a copolymer of 2- or 3-hydroxypropylmethacrylate (HEMA) and a hydrophobic crosslinker.

9. The method of claim 1, wherein the polymer is a copolymer of 2 or 3-hydroxypropylmethacrylate (HEMA) and ethylene glycol dimethacrylate (EDMA).

10. The method of claim 1, wherein the polymer is porous.

11. The method of claim 10, wherein the porosity is the result of polymerization in chloroform, toluene, acetonitrile or other pore-forming solvent.

12. The method of claim 1, wherein:
   (a) the moieties of the cross-linker in the polymer are in molar excess of the moieties of the monomer; or
   (b) the moieties of the cross-linker and monomer are present in the polymer in a molar ration of from 3:1 to 10:1; or
   (c) the molar ratio of moieties of the cross-linker and non-acidic monomer in the polymer is from 4:1 to 6:1.

13. The method of claim 1, wherein the material is tobacco, a tobacco material or a tobacco product.

14. The method of claim 13, wherein:
   the tobacco material is treated with an extraction fluid to form an extract;
   the extract is treated with the polymer; and
   material remaining in the extract is recombined with the tobacco material.

15. The method of claim 14, wherein the polymer is washed after treatment of the extract, and nicotine is recovered from the washings and nicotine in the washings is recombined with the treated extract.

16. The method of claim 1, having any of the following features:
   (a) producing tobacco leaf, treating the leaf with the polymer in order to reduce the TSNA content of the leaf, producing a consumable tobacco product therefrom and supplying the tobacco product to a consumer so as to deliver the nicotine;
   (b) an analysis, detection, quantification, separation, extraction, chromatography, sample preparation, chemical sensors, or solid phase extraction;
   (c) wherein the material is a biological fluid and the method includes any of an analysis, detection, quantification, separation, extraction, chromatography, sample preparation, chemical sensors, or solid phase extraction;
   (d) wherein the material is a tobacco product produced by the thermal decomposition of a material containing tobacco, a tobacco substitute or a mixture thereof;
   (e) the material is produced by the thermal decomposition of a material containing tobacco, a tobacco substitute or a mixture thereof by heating the material to a temperature below its combustion temperature;
   (f) the material is produced by the thermal decomposition of a material containing tobacco, a tobacco substitute or a mixture thereof by combustion of the material.

\* \* \* \* \*